(12) United States Patent
Kuroda et al.

(10) Patent No.: US 7,466,495 B2
(45) Date of Patent: Dec. 16, 2008

(54) IMAGE PICKUP APPARATUS AND ZOOM LENS

(75) Inventors: Daisuke Kuroda, Kanagawa (JP); Takeshi Hatakeyama, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/078,835

(22) Filed: Apr. 7, 2008

(65) Prior Publication Data

US 2008/0225405 A1 Sep. 18, 2008

(30) Foreign Application Priority Data

Jan. 15, 2007 (JP) ............... 2007-005976
Sep. 13, 2007 (JP) ............... 2007-238158

(51) Int. Cl.
*G02B 15/14* (2006.01)

(52) U.S. Cl. .............. 359/683; 359/684; 359/685; 359/686; 359/687; 359/688; 359/689; 359/690; 359/691; 359/692; 359/713; 359/714; 359/715; 359/716; 359/717; 359/740; 396/120; 396/125; 396/147

(58) Field of Classification Search .......... 396/120, 396/125, 147; 359/683–692, 708, 713–717, 359/740

See application file for complete search history.

(56) References Cited

U.S. PATENT DOCUMENTS 6,594,087 B2 * 7/2003 Uzawa et al. ............ 359/685
7,365,911 B2 * 4/2008 Yamashita et al. ........ 359/676
7,372,635 B2 * 5/2008 Morooka et al. ............ 359/687
2007/0002460 A1 * 1/2007 Yamamoto et al. ........ 359/687
2007/0070522 A1 * 3/2007 Sensui ................ 359/687

FOREIGN PATENT DOCUMENTS

JP 2000-299874 10/2000
JP 2004-336106 11/2004

* cited by examiner

*Primary Examiner*—Evelyn A. Lester
(74) *Attorney, Agent, or Firm*—Rader Fishman & Grauer PLLC; Ronald P. Kananen

(57) ABSTRACT

An image pickup apparatus includes a zoom lens including at least two movable lens groups; an image pickup element that converts an optical image formed with the zoom lens into an electric signal; and an image processor that electrically corrects a lateral chromatic aberration to be generated at the zoom lens. The zoom lens satisfies Conditional Expressions (1) and (2) as follows, $$-5.0 < W\_ate(X)/T\_ate(X) < -0.2 \qquad (1)$$

$$0.003 < |Max\_ate(10)/Himg| < 0.03 \qquad (2)$$

where $W\_ate(X)$ is an aberration amount of the lateral chromatic aberration from the C-line to the g-line, at a wide-angle end, corresponding to a (X×10) % image height, $T\_ate(X)$ is an aberration amount of the lateral chromatic aberration from the C-line to the g-line, at a telephoto end, corresponding to a (X×10) % image height, $Max\_ate(X)$ is one of $W\_ate(10)$ and $T\_ate(10)$, the one having a larger absolute value, and Himg is a diagonal length of the image pickup element.

12 Claims, 25 Drawing Sheets

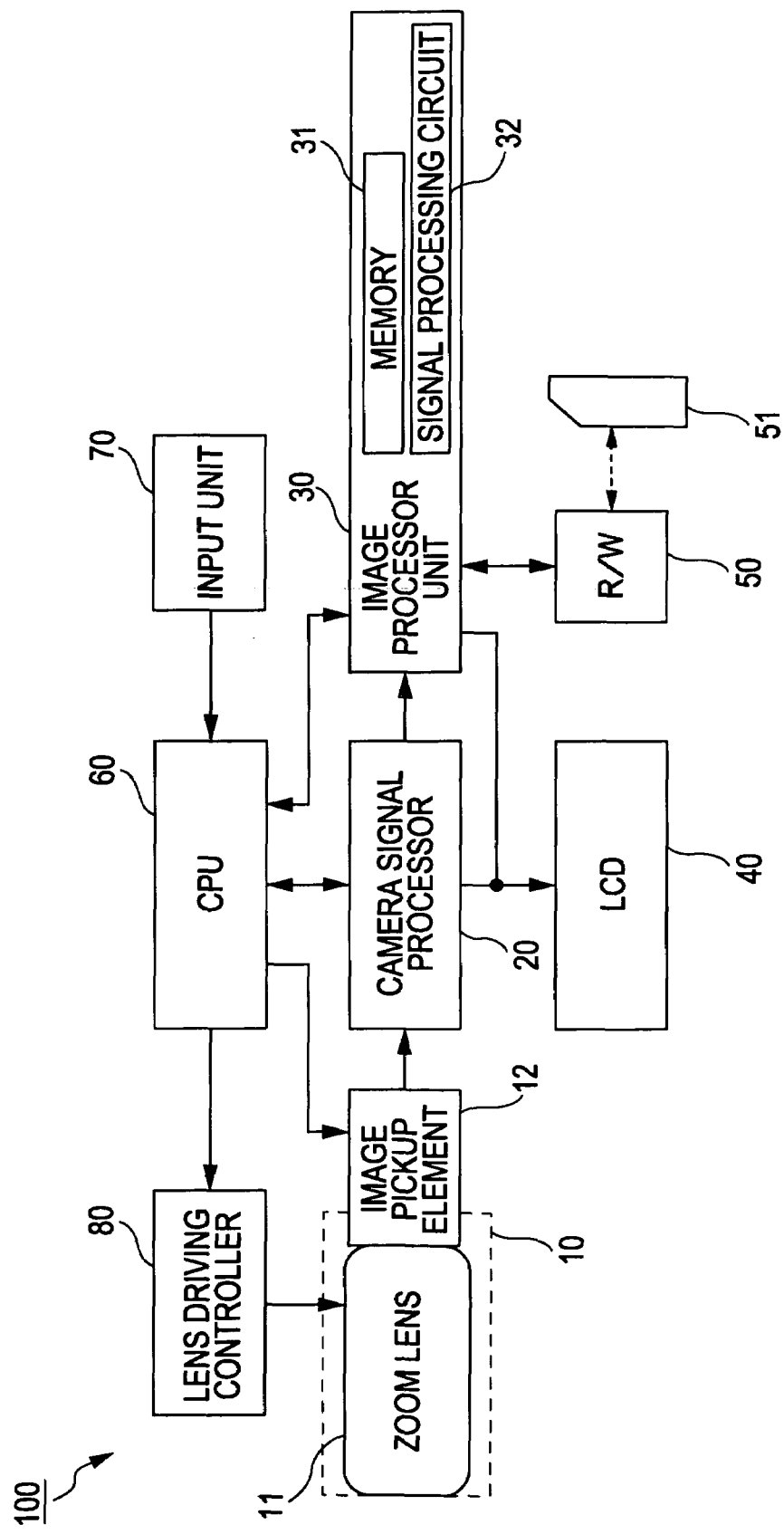

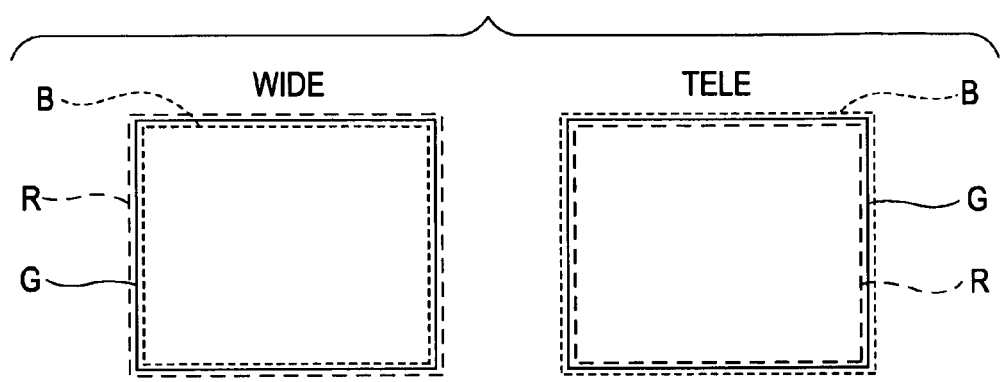
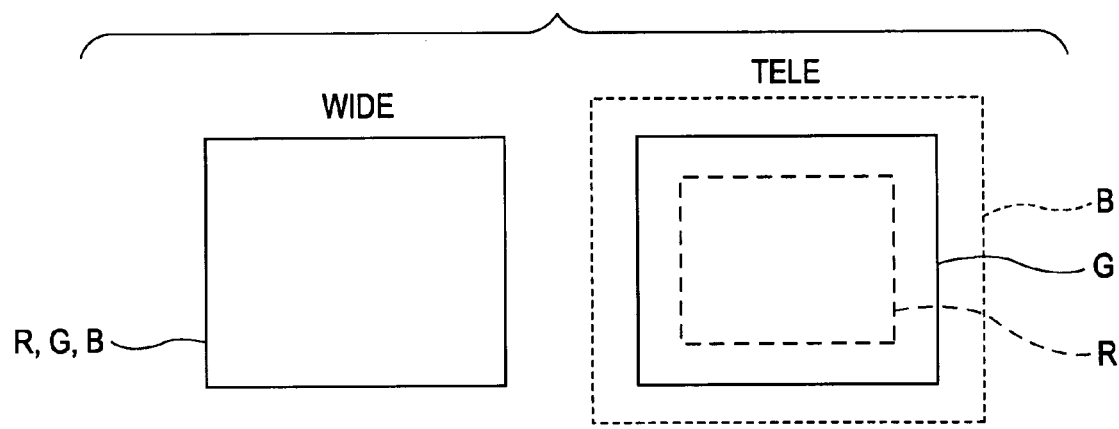
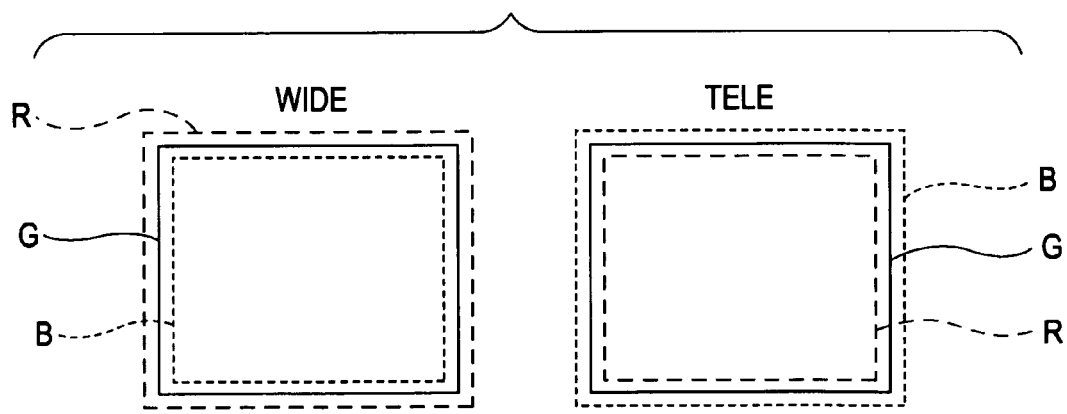

IMAGE PICKUP APPARATUS AND ZOOM LENS

CROSS REFERENCES TO RELATED APPLICATIONS

The present invention contains subject matter related to Japanese Patent Application JP 2007-238158 filed in the Japanese Patent Office on Sep. 13, 2007, and Japanese Patent Application JP 2007-005976 filed in the Japanese Patent Office on Jan. 15, 2007, the entire contents of which are incorporated herein by reference.

BACKGROUND OF THE INVENTION

1. Field of the Invention

The present invention relates to a new image pickup apparatus and a new zoom lens. In particular, the present invention relates to an image pickup apparatus suitable for a digital still camera, a digital video camera, and a camera portion of a mobile phone etc., the image pickup apparatus using an image processing system capable of efficiently correcting a lateral chromatic aberration, and also relates to a zoom lens for the image pickup apparatus.

2. Description of the Related Art

In recent years, an image pickup apparatus using a solid-state image pickup element, such as a digital still camera, is widely used. With the wide use of the digital still camera, reduction in size and cost, and increase in performance are demanded for the image pickup apparatus. In particular, as the pixel pitch of the image pickup apparatus becomes extremely small, a chromatic aberration to be generated at an optical system becomes noticeable. Japanese Unexamined Patent Application Publication No. 2000-299874 and No. 2004-336106 have suggested a method of correcting a chromatic aberration to be generated at an optical system by using an image processing system provided in an image pickup apparatus.

SUMMARY OF THE INVENTION

The above-mentioned image pickup apparatus corrects the generated chromatic aberration (and distortion) by optimization with the image processing system. With the image pickup apparatus of related art, however, it is presupposed that the image processing system complementally corrects an aberration that has not been corrected by the optical system. Thus, the optical system has to correct various aberrations including the lateral chromatic aberration as much as possible. Therefore, even if the image processing system can correct the lateral chromatic aberration, the provision of the image processing system makes only a small contribution to the reduction in size and increase in magnification range of the optical system such as a zoom lens.

In light of the above situations, it is desirable to reduce the size and cost of a zoom lens and increase the magnification range of the zoom lens, as well as to reduce a task of an image processing system for lateral chromatic aberration correction, by positively utilizing the image processing system for the lateral chromatic aberration correction, permitting a markedly larger aberration amount of the lateral chromatic aberration in an optical system than that in an optical system of related art, and determining aberration amounts of the lateral chromatic aberrations at a wide-angle end and a telephoto end.

An image pickup apparatus according to an embodiment of the present invention includes a zoom lens including at least two movable lens groups; an image pickup element that converts an optical image formed with the zoom lens into an electric signal; and an image processor that electrically corrects a lateral chromatic aberration to be generated at the zoom lens. Also, the zoom lens satisfies Conditional Expressions (1) and (2) as follows:

$$-5.0 < W\_ate(X)/T\_ate(X) < -0.2 \quad (1)$$

$$0.003 < |Max\_ate(10)/Himg| < 0.03 \quad (2)$$

where $W\_ate(X)$ is an aberration amount of the lateral chromatic aberration from the C-line to the g-line, at a wide-angle end, corresponding to a $(X \times 10)$ % image height, $T\_ate(X)$ is an aberration amount of the lateral chromatic aberration from the C-line to the g-line, at a telephoto end, corresponding to a $(X \times 10)$ % image height, $Max\_ate(X)$ is one of $W\_ate(10)$ and $T\_ate(10)$, having a larger absolute value, and Himg is a diagonal length of the image pickup element.

A zoom lens according to an embodiment of the present invention is for an image pickup apparatus, the image pickup apparatus including an image processor that converts an optical image obtained by capturing into an electric image signal, and electrically corrects a lateral chromatic aberration in an image on the basis of the image signal. The zoom lens includes at least two movable lens groups, and satisfies Conditional Expressions (1) and (2) as follows:

$$-5.0 < W\_ate(X)/T\_ate(X) < -0.2 \quad (1)$$

$$0.003 < |Max\_ate(10)/Himg| < 0.03 \quad (2)$$

where $W\_ate(X)$ is an aberration amount of the lateral chromatic aberration from the C-line to the g-line, at a wide-angle end, corresponding to a $(X \times 10)$ % image height, $T\_ate(X)$ is an aberration amount of the lateral chromatic aberration from the C-line to the g-line, at a telephoto end, corresponding to a $(X \times 10)$ % image height, $Max\_ate(X)$ is one of $W\_ate(10)$ and $T\_ate(10)$, having a larger absolute value, and Himg is a diagonal length of the image pickup element.

With the embodiments of the present invention, the zoom lens can be reduced in size and cost, and the magnification range of the zoom lens can be increased. In addition, the task of the image processing system for the chromatic aberration correction can be reduced in the image pickup apparatus.

BRIEF DESCRIPTION OF THE DRAWINGS

FIG. 1 is a block diagram showing an image pickup apparatus according to an embodiment of the present invention;

FIGS. 2A to 2C are explanatory illustrations schematically showing generation of lateral chromatic aberrations in zoom lenses, FIG. 2A showing color blurring caused by a lateral chromatic aberration, FIG. 2B showing generation of a lateral chromatic aberration in a zoom lens of related art, FIG. 2C showing generation of lateral chromatic aberrations in a zoom lens according to an embodiment of the present invention;

FIG. 4 shows longitudinal aberrations (spherical aberration, astigmatism, and distortion) at a wide-angle end;

FIG. 7 shows a lateral aberration at the wide-angle end;

FIG. 4 shows longitudinal aberrations (spherical aberration, astigmatism, and distortion) at a wide-angle end;

FIG. 7 shows a lateral aberration at the wide-angle end;

FIG. 18 shows longitudinal aberrations (spherical aberration, astigmatism, and distortion) at a wide-angle end;

FIG. 7 shows a lateral aberration at the wide-angle end;

DESCRIPTION OF THE PREFERRED EMBODIMENTS

Figure 3:
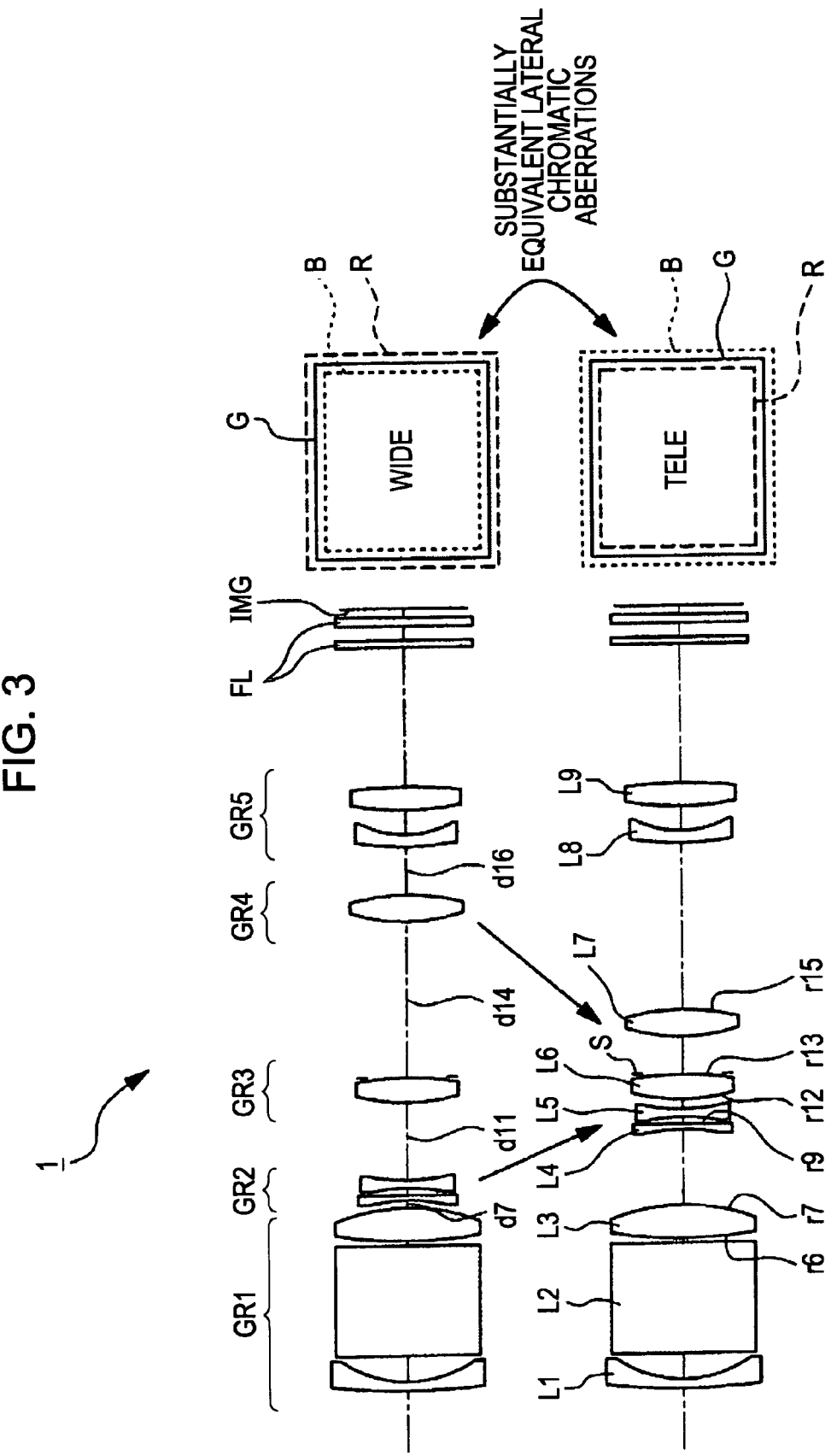
FIG. 3 is an illustration showing a lens arrangement of a zoom lens according to a first embodiment of the present invention.

Preferred embodiments of the present invention for implementing an image pickup apparatus and a zoom lens are described below.

An image pickup apparatus according to an embodiment of the present invention includes a zoom lens including at least two movable lens groups; an image pickup element that converts an optical image formed with the zoom lens into an electric signal; and an image processor that electrically corrects a lateral chromatic aberration to be generated at the zoom lens. Also, the zoom lens satisfies Conditional Expressions (1) and (2) as follows:

$$-5.0 < W\_ate(X)/T\_ate(X) < -0.2 \quad (1)$$

$$0.003 < |Max\_ate(10)/Himg| < 0.03 \quad (2)$$

where $W\_ate(X)$ is an aberration amount of the lateral chromatic aberration from the C-line to the g-line, at a wide-angle end, corresponding to a $(X \times 10)$ % image height, $T\_ate(X)$ is an aberration amount of the lateral chromatic aberration from the C-line to the g-line, at a telephoto end, corresponding to a $(X \times 10)$ % image height, $Max\_ate(X)$ is one of $W\_ate(10)$ and $T\_ate(10)$, having a larger absolute value, and Himg is a diagonal length of the image pickup element.

With the embodiment of the present invention, the zoom lens can be reduced in size and cost, and the magnification range of the zoom lens can be increased. In addition, the task of the image processing system for the chromatic aberration correction can be reduced in the image pickup apparatus.

As shown in FIG. 2A, to correct a chromatic aberration according to a zoom lens of related art, it is presupposed that a slightly remaining chromatic aberration (blurring of the red color R (broken line) appears on the outside and blurring of the blue color B (dotted line) appears on the inside of the green color G at an wide-angle end at the left side in the drawing, whereas blurring of the blur color B appears on the outside and blurring of the red color R appears on the inside of the green color G (solid line) at a telephoto end at the right side in the drawing) that has not been corrected by an optical system is complementally corrected by an image processing system. The correction amount, however, is limited. Also, angles of field to be corrected are typically limited to such as a wide-angle end, a telephoto end, and an angle of field corresponding to macro photographing. That is, a system is constructed under a design concept such that the optical system is designed to minimize a lateral chromatic aberration, and a remaining lateral chromatic aberration that has not been corrected is electrically complementally corrected. Accordingly, a substantially complete performance is demanded for the optical system regardless of whether the optical system performs the lateral chromatic aberration correction. However, correcting the lateral chromatic aberration with the image processing system makes only a small contribution to the reduction in size and cost.

In contrast, according to the embodiment of the present invention, the optical configuration in the past may be markedly changed by positively utilizing lateral chromatic aberration correction, and permitting a markedly larger aberration amount of the lateral chromatic aberration in an optical system than that in the optical system of related art. For example, the cost can be reduced by changing a cemented lens used for chromatic aberration correction to a single lens, and the size can be reduced and the magnification range can be increased by using a glass member having a low Abbe number and a high refractive index.

In a case where the image processing for a lateral chromatic aberration is performed, when a lateral chromatic aberration of a zoom lens is to be corrected, colors R, G, B are usually respectively multiplied by their magnifications Mr, Mg, Mb (thereby, $R'=R \cdot Mr$, $G'=G \cdot Mg$, $B'=B \cdot Mb$), to correct the colors (such that R becomes R', G becomes G', B becomes B'). With such a correction method, as shown in FIG. 2B, if aberration amounts of the lateral chromatic aberrations generated at the wide-angle end (left side) and the telephoto end (right side) are unevenly distributed (in FIG. 2B, an aberration amount at the telephoto end is larger), a correction amount of B or R with respect to G becomes extremely large. It is necessary to increase a memory capacity for correction. Also, the side whose magnification is increased (the color which is enlarged) may have a large magnification, resulting in the resolution thereof being degraded.

With the image pickup apparatus according to the embodiment of the present invention, by satisfying Conditional Expression (1), chromatic aberrations generated at the zoom lens can be evenly distributed at the wide-angle end and the telephoto end as shown in FIG. 2C. Accordingly, the memory capacity for the correction can be prevented from being increased, and can be efficiently used. Also, the magnifications and reductions of the colors R and B with respect to the color G can be controller to be substantially equivalent at the wide-angle end and telephoto end. Thus, correction can be performed while the resolutions of the colors R and B with respect to the color G are maintained. In this case, it is desirable to correct a lateral chromatic aberration at an intermediate angle of view, and evenly distribute lateral chromatic aberrations generated at the wide-angle end and telephoto end, while preventing a longitudinal chromatic aberration from being generated as in numerical examples (described below) of a zoom lens. In particular, Conditional Expression (1) is desirably satisfied at a 70% image height in view of optical correction.

Conditional Expression (2) determines a ratio of a larger aberration amount of the lateral chromatic aberration between aberration amounts at the wide-angle end and telephoto end, to a diagonal length of the image pickup element. In particular, if a value of |Max_ate(X)/Himg| is 0.003 or smaller (i.e., 0.3% or smaller of the diagonal length of the image pickup element), the ratio of correction of the lateral chromatic aberration is too small, and hence, it is difficult to reduce the size and cost, and to increase the magnification range. In contrast, if a value of |Max_ate(X)/Himg| is 0.03 or larger (5% or larger of the diagonal length of the image pickup element), the memory capacity for the correction becomes large and the correction range becomes large, and hence, the processing time is increased. Also, the side whose magnification is increased (the color to be enlarged) may have an extremely large magnification, resulting in the resolution being degraded. More particularly, 0.006<|Max_ate(X)/Himg|<0.015 is desirably satisfied.

In the image pickup apparatus according to the embodiment of the present invention, the zoom lens desirably satisfies Conditional Expressions (3), (4), and (5) as follows, $$PSF\_r < \alpha \quad (3)$$

$$PSF\_g < \alpha \quad (4)$$

$$PSF\_b < \alpha \quad (5)$$

where PSF_r is a point spread range of a red component R on an image plane, PSF_g is a point spread range of a green component G on the image plane, PSF_b is a point spread range of a blue component B on an image plane, and $\alpha$ is a desirable resolution, which is a permissible circle of confusion, of the image pickup apparatus.

Figure 24:
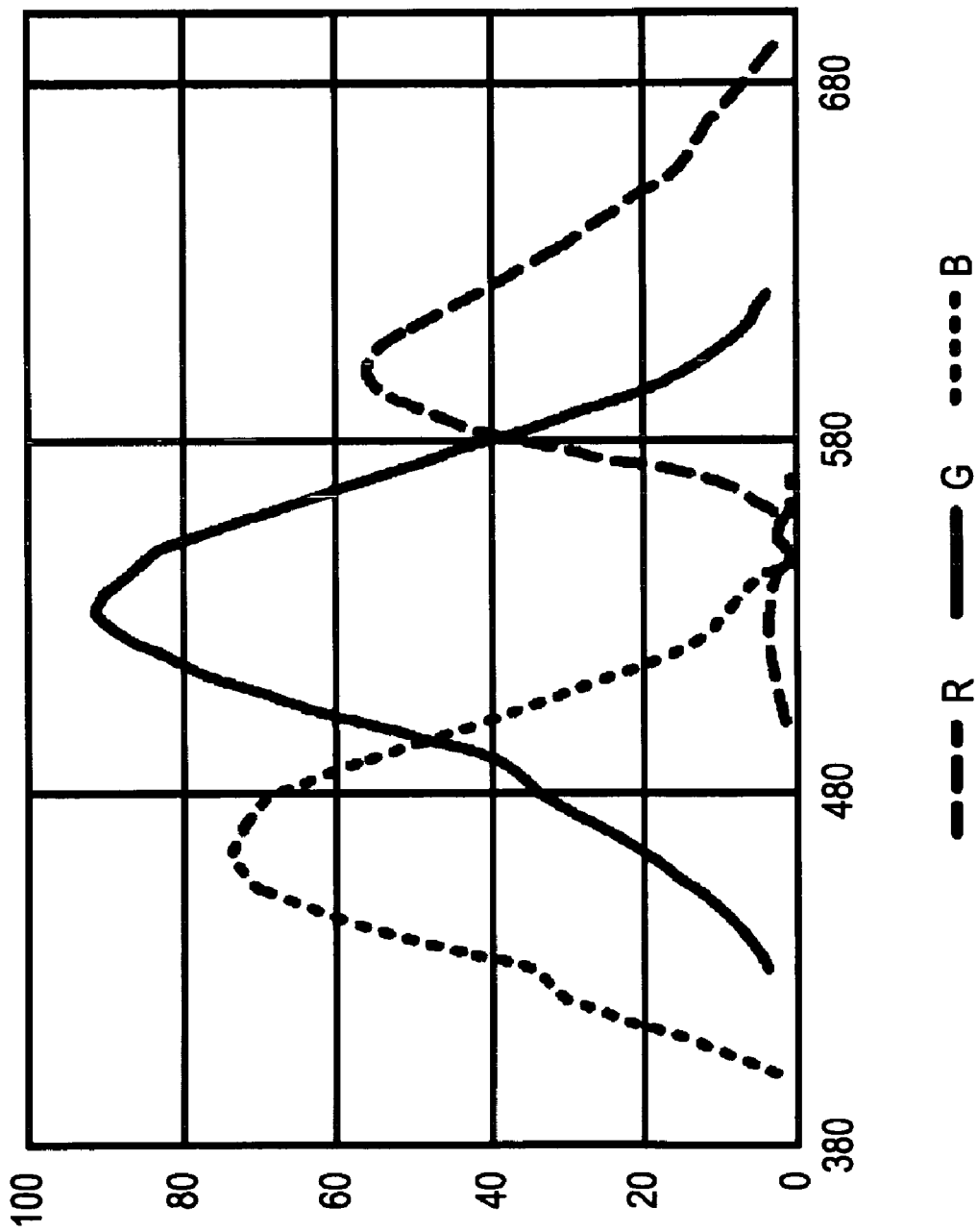
FIG. 24 is a graph showing wavelength ranges of red color R, green color G, and blue color B.
Figure 25A:
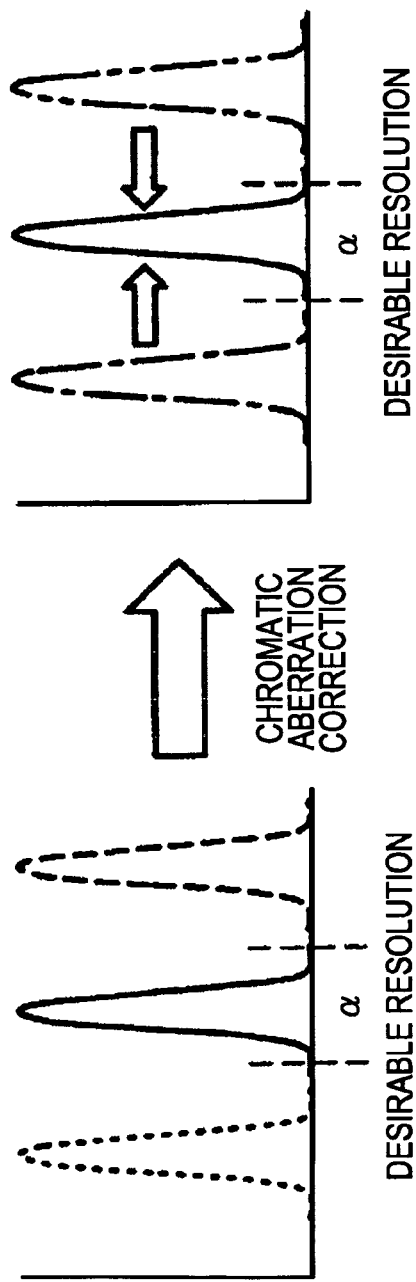
FIGS. 25A and 25B are graphs each showing a relationship between chromatic aberration correction and a desirable resolution, FIG. 25A showing that a point spread after the chromatic aberration correction is within the desirable resolution, FIG. 25B showing that a point spread after the chromatic aberration correction is beyond the desirable resolution.
Figure 25B:
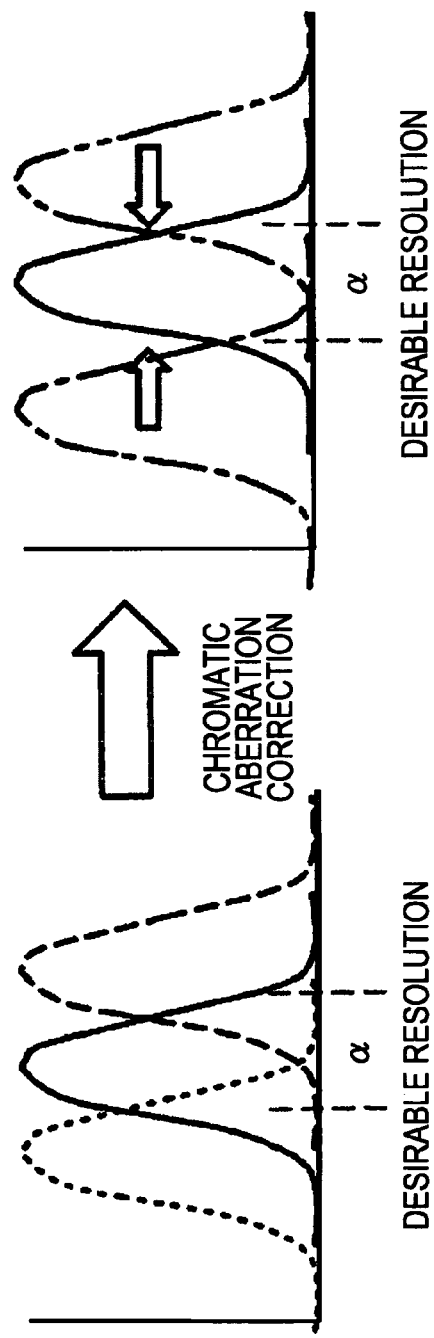

Conditional Expressions (3), (4), and (5) define point spread ranges or line spread ranges when wavelength ranges weighted in the colors R, G, and B as shown in FIG. 24 are used. If Conditional Expressions (3), (4), and (5) are satisfied, that is, if the point spread ranges (line spread ranges) in the image plane for the colors R, G, and B are smaller than a desirable resolution $\alpha$ (FIG. 25A), the line spread ranges are located within the desirable resolution after the chromatic aberration correction (in the drawing at the right side), i.e., aberration components located at a one-dot chain line for B and at a two-dot chain line for R are located within a solid line at the center. Therefore, the chromatic aberration can be efficiently corrected. In contrast, if the line spread ranges are located beyond the desirable resolution $\alpha$ as shown in FIG. 25B, i.e., if a solid line is beyond the desirable resolution a although aberration components located at a one-dot chain line for B and at a two-dot chain line for R are located within the solid line at the center, the line spread ranges may be located beyond the range of the desirable resolution even after the chromatic aberration correction. Therefore, it is difficult to improve a finally obtainable image quality even after the chromatic aberration correction. That is, in the optical system suitable for the lateral chromatic aberration correction system, it is necessary to correct a coma and a field curvature with a level equivalent to a lens of related art.

Satisfying Conditional Expressions (3), (4), and (5) reduces a variation in aberration amount of a lateral chromatic aberration when an aperture stop is stopped down, and hence, correction values do not have to be controlled in accordance with aperture values. Accordingly, the system is simplified.

It is noted that the desirable resolution a may be varied for the colors R, G, and B, in accordance with the array of color filters of a charge-coupled device (CCD).

A desirable resolution $\alpha$ is determined depending on an image pickup element and an image processing system used for an image pickup apparatus, and is also referred to as a permissible circle of confusion.

In the image pickup apparatus according to the embodiment of the present invention, the image processor may have a lateral chromatic aberration information item, a distortion information item, and a marginal illumination information item, in accordance with an image height of the image pickup element and an angle of view of the zoom lens. Also, the image processor may include a signal processing unit configured to perform predetermined signal processing for an image signal to correct the chromatic aberration on the basis of the information items.

The image processor provided in the image pickup apparatus according to the embodiment of the present invention may employ a specific configuration disclosed in Japanese Unexamined Patent Application Publication No. 2000-299874 or No. 2004-336106, or any other similar configuration, as long as the image processor electrically corrects a lateral chromatic aberration generated at a zoom lens. However, if the image processor has the above-described configuration, functions of these units can be clarified, and the configuration can be simplified. In particular, the lateral chromatic aberration information item, the distortion information item, and the marginal illumination information item in accordance with an image height of the image pickup element and an angle of view of the zoom lens are prepared in advance. These information items are referred depending on a photographing condition to select a correction amount for an aberration. Accordingly, the configuration and action of the image processor can be simplified.

In the image pickup apparatus according to the embodiment of the present invention, it is desirable to employ the zoom lens suitable for the image processing system for the chromatic aberration correction to efficiently correct an aberration. By positively utilizing electrical correction of a distortion and a marginal illumination in addition to the lateral chromatic aberration correction, a zoom lens providing advantages of reduction in size and cost, and increase in magnification range, the advantages which could not be realized in the past, can be provided. In this case of the zoom lens, the image processing system is necessary to have correction information items for various aberrations at the zoom lens.

In the image pickup apparatus according to the embodiment of the present invention, the image processor may include an aberration-amount detecting unit configured to detect an aberration amount of the chromatic aberration by using an image signal obtained from the image pickup apparatus, in accordance with a distance from a reference position in an image on the basis of the image signal, and a signal processing unit configured to perform predetermined signal processing for the image signal to correct the chromatic aberration, on the basis of the aberration amount detected by the aberration-amount detecting unit.

The aberration amount of the lateral chromatic aberration of the zoom lens is theoretically determined on the basis of design values. However, the aberration amount may be actually varied because of various factors during manufacturing. Thus, zoom lenses manufactured with the same design may have individual differences. As described above, by detecting the aberration amount, a correction amount unique to an individual zoom lens can be determined, and the lateral chromatic aberration can be corrected highly accurately.

FIG. 1 is a block diagram showing an image pickup apparatus according to a specific embodiment of the present invention.

An image pickup apparatus 100 shown in FIG. 1 is configured as a digital still camera.

A digital still camera 100 includes a lens block 10 having an image-capturing function, a camera signal processor 20 that performs signal processing such as analog-to-digital conversion of a captured image signal, an image processor 30 that performs recording and reproducing processing of the image signal, a liquid crystal display (LCD) 40 that displays a captured image and the like, a reader/writer (R/W) 50 that writes or reads image data on or from a memory card 51, a central processing unit (CPU) 60 that controls the entire apparatus, an input unit 70 for an input operation by a user, and a lens driving controller 80 that controls driving of lenses provided in the lens block 10.

The lens block 10 includes, for example, an optical system containing a zoom lens 11 to which the present invention is applied, and an image pickup element 12 such as a CCD. The camera signal processor 20 performs signal processing including conversion of an output signal from the image pickup element 12 into a digital signal, denoising, correction of the image quality, and conversion of a signal into a luminance signal and a color-difference signal. The image processor 30 performs compressing and encoding processing, and decompressing and decoding processing for an image signal on the basis of a predetermined image data format; and conversion of a data specification such as a resolution. Also, the image processor 30 electrically corrects a lateral chromatic aberration generated at the zoom lens 11. In particular, the image processor 30 includes a memory 31 and a signal processing circuit 32. The memory 31 stores a lateral chromatic aberration information item, a distortion information item, and a marginal illumination information item, at the zoom lens 11 in accordance with an image height of the image pickup element 12 and an angle of view of the zoom lens. The signal processing circuit 32 refers the memory 31 in accordance with the photographing condition, such as a zoom position, a focus position, and a stop diameter, and performs predetermined signal processing for correcting an aberration, such as the chromatic aberration, of the image signal.

The memory card 51 is a removable semiconductor memory. The reader/writer 50 writes image data encoded by the image processor 30 on the memory card 51, or reads image data stored in the memory card 51. The CPU 60 is a control processing unit that controls circuit blocks provided in the digital still camera 100. The CPU 60 controls the circuit blocks on the basis of an instruction input signal or the like from the input unit 70.

The input unit 70 includes, for example, a shutter release button for a shutter operation, and a mode selection switch for selecting an operation mode. The input unit 70 outputs an instruction input signal corresponding to an operation of the user to the CPU 60. The lens driving controller 80 controls a motor (not shown) etc. for driving lenses provided in the zoom lens 11, on the basis of a control signal from the CPU 60.

An operation of the digital still camera 100 is briefly described below.

In a standby state of photographing, under the control of the CPU 60, an image signal captured with the lens block 10 is output to the camera signal processor 20, and then to the LCD 40, thereby being displayed as a camera-through image. When an instruction input signal for zooming is input from the input unit 70, the CPU 60 outputs a control signal to the lens driving controller 80, and a predetermined lens in the zoom lens 11 is moved on the basis of the control of the lens driving controller 80.

When a shutter (not shown) provided in the lens block 10 is released in accordance with an instruction input signal from the input unit 70, a captured image signal is output from the camera signal processor 20 to the image processor 30, an aberration such as a chromatic aberration of the signal is corrected, and then the compressing and encoding processing is performed for the signal, so that the signal is converted into digital data with a predetermined format. The converted data is output to the reader/writer 50, and is written on the memory card 51.

Focusing can be performed, for example, when the shutter release button is half pressed, or fully pressed for recording, and accordingly, the lens driving controller 80 allows a predetermined lens in the zoom lens 11 to be moved on the basis of a control signal from the CPU 60.

To reproduce image data stored in the memory card 51, in accordance with an operation with the input unit 70, the reader/writer 50 reads desired image data from the memory card 51, the image processor 30 performs the decompressing and decoding processing for the image data, and then a reproduction image signal is output to the LCD 40. Accordingly, a reproduction image is displayed.

In the above-described embodiment, while the image pickup apparatus according to the embodiment of the present invention is applied to a digital still camera, the image pickup apparatus may be applied to, for example, other image pickup apparatus such as a video camera.

Next, a zoom lens suitable for the image pickup apparatus according to the embodiment of the present invention is described below.

A zoom lens according to an embodiment of the present invention is for an image pickup apparatus, the image pickup apparatus including an image processor that converts an optical image obtained by capturing into an electric image signal, and electrically corrects a lateral chromatic aberration in an image on the basis of the image signal.

The zoom lens includes at least two movable lens groups, and satisfies Conditional Expressions (1) and (2) as follows:

$$-5.0 < W\_ate(X)/T\_ate(X) < -0.2 \qquad (1)$$

$$0.003 < |Max\_ate(10)/Himg| < 0.03 \qquad (2)$$

where W_ate(X) is an aberration amount of the lateral chromatic aberration from the C-line to the g-line, at a wide-angle end, corresponding to a (X×10) % image height, T_ate(X) is an aberration amount of the lateral chromatic aberration from the C-line to the g-line, at a telephoto end, corresponding to a (X×10)% image height, Max_ate(X) is one of W_ate(10) and T_ate(10), having a larger absolute value, and Himg is a diagonal length of the image pickup element.

With the zoom lens according to the embodiments of the present invention, as described above, the zoom lens can be reduced in size and cost, and the magnification range of the zoom lens can be increased. In addition, the task of the image processing system for the chromatic aberration correction can be reduced in the image pickup apparatus. In particular, Conditional Expression (1) is desirably satisfied at a 70% image height.

With the zoom lens according to the embodiment of the present invention, the optical configuration in the past can be markedly changed by positively utilizing lateral chromatic aberration correction provided in the image pickup apparatus, and permitting a markedly larger aberration amount of the lateral chromatic aberration in an optical system than that in an optical system of related art. For example, the cost can be reduced by changing a cemented lens used for the chromatic aberration correction to a single lens, and the size can be reduced and the magnification range can be increased by using a glass member having a low Abbe number and a high refractive index.

With the zoom lens according to the embodiment of the present invention, chromatic aberrations generated at the zoom lens can be evenly distributed at a wide-angle end and a telephoto end. Accordingly, the memory capacity for the correction can be prevented from being increased in the image pickup apparatus, and can be efficiently used. Also, the magnifications and reductions of the colors R and B with respect to the color G can be controlled to be substantially equivalent at the wide-angle end and telephoto end. Thus, correction can be performed while the resolutions of the colors R and B with respect to the color G are maintained.

The zoom lens according to the embodiment of the present invention desirably satisfies Conditional Expressions (3), (4), and (5) as follows, $$PSF\_r < \alpha \tag{3}$$

$$PSF\_g < \alpha \tag{4}$$

$$PSF\_b < \alpha \tag{5}$$

where PSF_r is a point spread range of a red component R on an image plane, PSF_g is a point spread range of a green component G on the image plane, PSF_b is a point spread range of a blue component B on an image plane, and α is a desirable resolution, which is a permissible circle of confusion, of the image pickup apparatus.

Accordingly, the image pickup apparatus can efficiently correct the chromatic aberration.

As described above, satisfying Conditional Expressions (3), (4), and (5) reduces a variation in aberration amount of the lateral chromatic aberration when an aperture stop is stopped down, and hence, correction values do not have to be controlled in accordance with aperture values. Accordingly, the system of the image pickup apparatus is simplified.

In the zoom lens according to the embodiment of the present invention, the zoom lens may include at least first to fourth lens groups in order from an object side. At least the second and fourth lens groups may be movable in an optical-axis direction for zooming. The first lens group may have a positive refractive power, the second lens group may have a negative refractive power, the third lens group may have a positive refractive power, and the fourth lens group may have a positive refractive power. The second lens group may only include negative lens elements.

Since at least the second and fourth lens groups are moved in the optical-axis direction for the zooming, and the second lens group only includes negative lens elements, the cost and size can be further reduced. In other words, the movable groups include the second lens group which is a negative lens group, and the fourth lens group which is a positive lens group, a variation in longitudinal chromatic aberration caused by the zooming can be canceled and corrected. Thus, the zoom lens can be an optical system suitable for the lateral chromatic aberration correction.

To be the optical system for the image processing system of the lateral chromatic aberration correction, it is presupposed that a longitudinal chromatic aberration and a coma for each wavelength is corrected. Thus, it is important to design the optical system such that a lateral chromatic aberration is within a range permissible to the system while a longitudinal chromatic aberration and a coma are corrected.

That is, according to the embodiment of the present invention, a longitudinal chromatic aberration has to be corrected by the optical system with a level equivalent to an optical system of related art which does not correct a lateral chromatic aberration with a system. Accordingly, in a case of the zoom lens according to the embodiment of the present invention including positive, negative, positive, positive lens groups, a longitudinal chromatic aberration at a telephoto end tends to be increased. In particular, the configuration of the first lens group makes a large contribution to the longitudinal chromatic aberration at the telephoto end. Thus, the configuration of the first lens group should have a configuration equivalent to that in an optical system of related art without correction.

In addition, during the zooming from the wide-angle end to the telephoto end, the second lens group having the negative power and the fourth lens group having the positive power cancel an aberration generated during the zooming, thereby correcting the aberration.

In the zoom lens according to the embodiment of the present invention, the zoom lens including the positive, negative, positive, and positive lens groups, the zoom lens desirably satisfies Conditional Expression (6) as follows:

$$-0.5 < f2/ft < -0.05 \tag{6}$$

where f2 is a focal length of the second lens group, and ft is a focal length of a total lens system at a telephoto end.

Conditional Expression (6) defines a ratio of a focal length of the second lens group having the negative refractive power and serving as a zooming group, to a focal length of the total lens system at the telephoto end. In particular, if a value of f2/ft is larger than −0.05, the power of the second lens group is too large. A variation in chromatic aberration during the zooming is increased, and hence, it is difficult to correct the variation in the total lens system. In contrast, if a value of f2/ft is smaller than −0.5, the total lens system may become large, or it is difficult to increase the magnification range of the zoom lens. Such a value is not desirable in view of the product design.

In the zoom lens according to the embodiment of the present invention, the zoom lens including the positive, negative, positive, and positive lens groups, the second lens group may have lens surfaces containing at least an aspherical surface.

In the zoom lens according to the embodiment of the present invention, the zoom lens including the positive, negative, positive, and positive lens groups, the fourth lens group may have lens surfaces containing at least an aspherical surface.

With the zoom lens according to the embodiment of the present invention, a coma has to be corrected by the optical system with a level equivalent to an optical system of related art which does not correct a lateral chromatic aberration with a system. Since the number of lens elements in each lens group is reduced, it is difficult to correct an aberration. However, by using an aspherical surface, the difficulty can be markedly reduced. In particular, it is desirable to arrange aspherical surfaces at the second and fourth lens groups, which are movable groups and thus have a large variation in aberration during the zooming. And more particularly, it is desirable to arrange an aspherical surface at the second lens group, which has a large variation in aberration during the zooming.

In the zoom lens according to the embodiment of the present invention, the zoom lens including the positive, negative, positive, and positive lens groups, the first lens group may be fixed during the zooming.

In the zoom lens according to the embodiment of the present invention, it is presupposed that a variation in longitudinal chromatic aberration during the zooming is corrected on the basis of the balance among the lens groups. Since the first lens group which makes a largest contribution to the longitudinal chromatic aberration correction at the telephoto end is movable, the balance may be degraded. Thus, the longitudinal chromatic aberration is no longer corrected. Accordingly, the first lens group is desirably fixed during the zooming.

In the zoom lens according to the embodiment of the present invention, the zoom lens including the positive, negative, positive, and positive lens groups, the second and fourth lens groups may each include at least a plastic lens.

With the zoom lens according to the embodiment of the present invention, the lateral chromatic aberration does not have to be positively corrected. Also, as described above, it is desirable to arrange an aspherical surface at the zooming group. In this case, to attain an advantage of reduction in cost, it is desirable to use a plastic lens in each group. Further, if the second lens group has a negative plastic lens, and the fourth lens group has a positive plastic lens, a variation in aberration with temperature and a variation in back focal length can be canceled.

Next, a zoom lens according to specific embodiments of the present invention is described below.

FIG. 3 shows a lens arrangement of a zoom lens 1 according to a first embodiment of the present invention. An upper portion of FIG. 3 illustrates positions of lens groups at a wide-angle end, and a lower portion of FIG. 3 illustrates positions of the lens groups at a telephoto end. Also, generation states of lateral chromatic aberrations are shown on the right side of the lens arrangement.

A zoom lens 1 includes a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power, in order from an object side. During zooming from the wide-angle end to the telephoto end, the first lens group GR1, third lens group GR3, and fifth lens group GR5 are fixed in an optical-axis direction, the second lens group GR2 moves on the optical axis from the object side to an image side, and the fourth lens group GR4 moves on the optical axis from the image side to the object side.

The first lens group GR1 includes a negative lens element L1, a right-angle prism L2 for bending the optical axis by 90°, and a positive lens element L3 having aspherical surfaces on both surfaces, in order from the object side to the image side. The second lens group GR2 includes a negative lens element L4 having an aspherical surface on an image-side surface, and a negative lens element L5, in order from the object side to the image side. The third lens group GR3 includes a positive lens element L6 having aspherical surfaces on both surfaces. The fourth lens group GR4 includes a positive lens element L7 having an aspherical surface on an object-side surface. The fifth lens group GR5 includes a negative lens element L8, and a positive lens element L9, in order from the object side to the image side. Blurring of a photographed image caused by a vibration of the image pickup apparatus can be corrected by shifting the positive lens element L9 of the fifth lens group GR5 in a direction perpendicular to the optical axis. An aperture stop S is arranged near the image side of the third lens group GR3. Filters FL, such as a low pass filter and an infrared cut filter, are arranged between the fifth lens group GR5 and an image plane IMG.

It is assumed that the shape of the aspherical surface is defined by Expression 1 as follows:

Expression 1

$$x = \frac{y^2 \cdot c^2}{1 + \sqrt{1 - (1+K) \cdot y^2 \cdot c^2}} + \sum A_i \cdot y^2$$

where x is a distance from a lens vertex in the optical-axis direction, y is a height in the direction perpendicular to the optical axis, c is a paraxial curvature at the lens vertex, K is a conic constant, and Ai is an aspherical coefficient at an i-th order.

Table 1 shows lens data according to Numerical Example 1 in which specific numerical values are applied to the zoom lens 1 according to the first embodiment. In Table 1 and tables described below representing lens data, reference character "i" denotes a surface number of an i-th surface counted from the object side, "ri" denotes a curvature radius of the i-th surface counted from the object side, "ASP" denotes a characteristic of the i-th surface counted from the object side, "ASP" representing that the surface is an aspherical surface, "REF" representing that the surface is a reflection surface, "di" denotes an axial surface distance between the i-th surface and an (i+1)-th surface counted from the object side, "ni", denotes a refractive index for the d-line (wavelength=587.6 nm) at the i-th surface counted from the object side, and "vi" is an Abbe number for the d-line at the i-th surface counted from the object side. In the column of "ri", "INF" represents that the surface is a plane. In the column of "di", "variable" represents that the surface distance is a variable distance. In the column of "i", "STOP" represents that the surface is an aperture stop, and "IMG" represents that the surface is an image pickup surface.

TABLE 1

| i | ri | ASP | di | ni | vi |
|---|---|---|---|---|---|
| 1 | 39.615 | | 0.600 | 1.83400 | 37.34 |
| 2 | 6.878 | | 1.700 | | |
| 3 | INF | | 3.500 | 1.83400 | 37.34 |

TABLE 1-continued

| i | ri | ASP | di | ni | vi |
|---|---|---|---|---|---|
| 4 | INF | REF | 3.500 | 1.83400 | 37.34 |
| 5 | INF | | 0.200 | | |

TABLE 1-continued

| i | ri | ASP | di | ni | vi |
|---|---|---|---|---|---|
| 6 | 20.631 | ASP | 2.000 | 1.76802 | 49.24 |
| 7 | −11.950 | ASP | variable | | |
| 8 | −22.339 | | 0.400 | 1.52470 | 56.24 |
| 9 | 49.436 | ASP | 0.500 | | |
| 10 | −9.832 | | 0.400 | 1.78864 | 39.58 |
| 11 | 11.596 | | variable | | |
| 12 | 12.380 | ASP | 1.500 | 1.58313 | 59.46 |
| 13 | −18.873 | ASP | 0.100 | | |
| STOP | INF | | variable | | |
| 15 | 10.506 | ASP | 1.646 | 1.52470 | 56.24 |
| 16 | −13.545 | | variable | | |
| 17 | 17.434 | | 0.700 | 1.92286 | 20.88 |
| 18 | 6.195 | | 1.500 | | |
| 19 | 13.522 | | 1.500 | 1.52470 | 56.24 |
| 20 | −45.934 | | 9.879 | | |
| 21 | INF | | 0.800 | 1.51680 | 64.20 |
| 22 | INF | | 0.600 | | |
| IMG | INF | | 0.000 | | |

During zooming from the wide-angle end to the telephoto end, a distance d7 between the first lens group GR1 and the second lens group GR2, a distance d11 between the second lens group GR2 and the third lens group GR3, a distance d14 between the third lens group GR3 (aperture stop S) and the fourth lens group GR4, and a distance d16 between the fourth lens group GR4 and the fifth lens group GR5 are varied. Table 2 shows values of these distances as well as a focal length "f", an F-number "Fno", and a half angle of view "ω", according to Numerical Example 1 respectively at a wide-angle end (f=6.53), an intermediate focal length (f=10.91), and a telephoto end (f=18.22).

TABLE 2

| f | 6.53 | 10.91 | 18.22 |
|---|---|---|---|
| Fno. | 3.58 | 4.24 | 5.60 |
| ω | 30.03 | 18.02 | 10.84 |
| d7 | 0.500 | 3.408 | 4.729 |
| d11 | 4.878 | 1.976 | 0.635 |
| d14 | 9.837 | 6.533 | 2.297 |
| d16 | 3.073 | 6.371 | 10.627 |

Both surfaces (r6, r7) of the positive lens element L3 of the first lens group GR1, an image-side surface (r9) of the object-side negative lens element L4 of the second lens group GR2, both surfaces (r12, r13) of the positive lens element L6 of the third lens group GR3, and an object-side surface (r15) of the positive lens element L7 of the fourth lens group GR4 are aspherical surfaces. Table 3 shows aspherical coefficients A4, A6, A8, and A10 as well as a conic constant K for each of 4th, 6th, 8th, and 10th surfaces according to Numerical Example 1. In Table 3, "E-i" represents an exponent based on 10, namely, it represents "10−i". For example, "0.12345E-05" represents "0.12345×$^{-5}$".

TABLE 3

| i | K | A4 | A6 | A8 | A10 |
|---|---|---|---|---|---|
| 6 | 0.0000E+00 | 3.9596E−05 | −9.9683E−06 | 5.0547E−07 | −3.7287E−08 |
| 7 | 0.0000E+00 | 1.2157E−04 | −8.5842E−06 | 2.2163E−07 | −2.4349E−08 |
| 9 | 0.0000E+00 | −1.4000E−03 | 8.7387E−05 | −1.8237E−05 | 1.4141E−06 |
| 12 | 0.0000E+00 | −3.7302E−05 | 1.3268E−04 | −1.4089E−05 | 8.5456E−07 |
| 13 | 0.0000E+00 | 4.1240E−04 | 1.0581E−04 | −7.9961E−06 | 4.8027E−07 |
| 15 | 0.0000E+00 | −3.0719E−04 | 1.0178E−06 | 1.7193E−07 | −2.2714E−08 |

Table 4 shows values corresponding to W_ate(X), T_ate (X), and Conditional Expressions (1) and (2) respectively at a 40% image height, a 70% image height, and a 100% image height according to Numerical Example 1 and related art.

TABLE 4

| | Image pickup element diagonal length Himg | | | 7.2 | |
|---|---|---|---|---|---|
| | Image height X | W_ate (X) | T_ate (X) | Conditional Expression (1) | Conditional Expression (2) |
| Numerical Example 1 | 40% | −0.0163 | 0.0055 | −2.94 | — |
| | 70% | −0.0304 | 0.0317 | −0.96 | — |
| | 100% | −0.0485 | 0.0474 | −1.02 | 0.007 |
| Related art | 40% | −0.0007 | −0.0001 | 9.17 | — |
| | 70% | −0.0026 | −0.0004 | 7.08 | — |
| | 100% | −0.0089 | −0.0012 | 7.20 | 0.001 |

Table 5 shows an initial surface (i) and a focal length (f) of each lens group.

TABLE 5

| | Initial surface | Focal length |
|---|---|---|
| First group | 1 | 16.108 |
| Second group | 8 | −5.331 |
| Third group | 12 | 13.052 |
| Fourth group | 15 | 11.549 |
| Fifth group | 17 | −27.527 |

Figure 4:
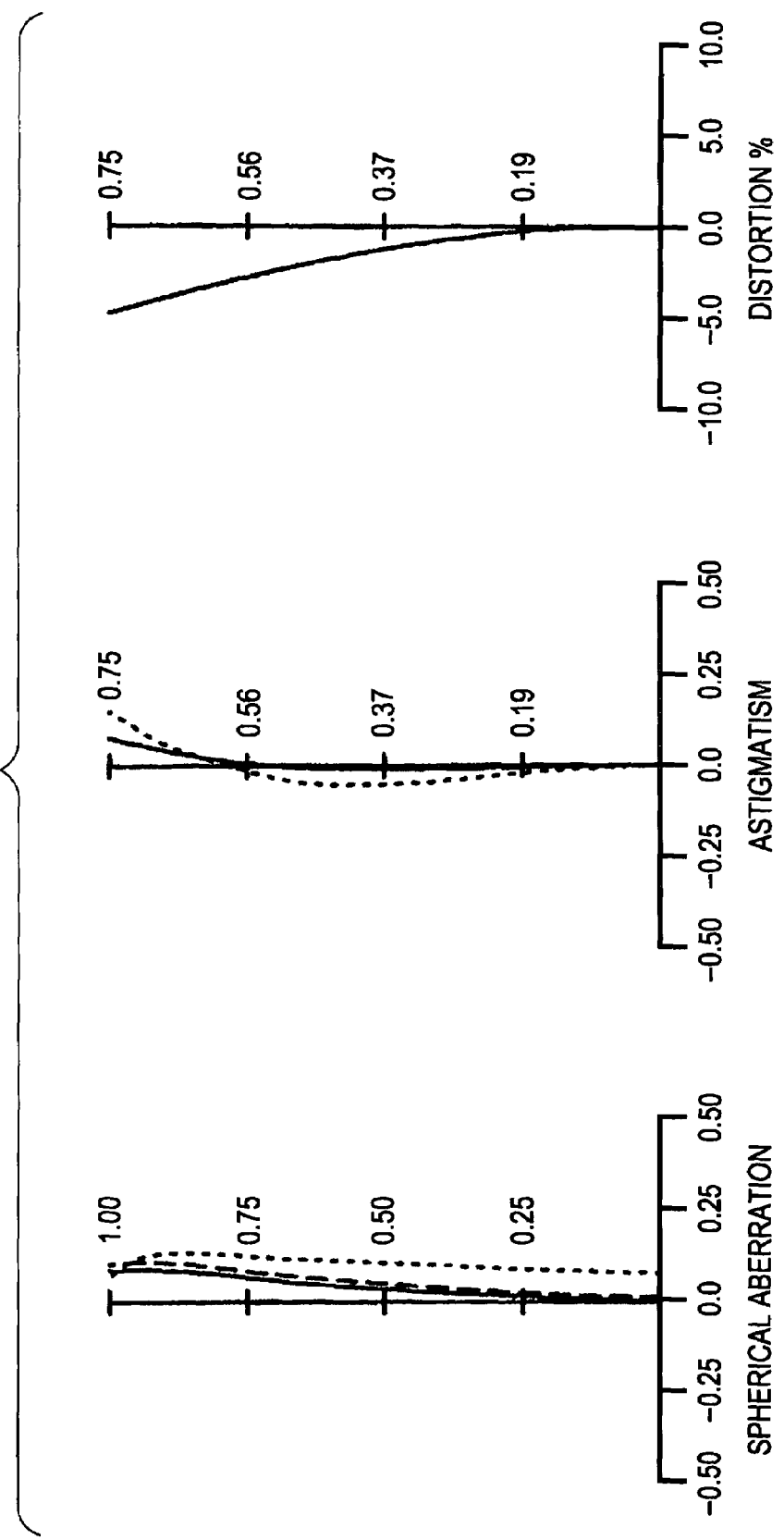
FIG. 4 shows aberration diagrams according to Numerical Example 1 in which, similarly to FIGS. 5 and 6, specific numerical values are applied to the first embodiment, in particular.
Figure 5:
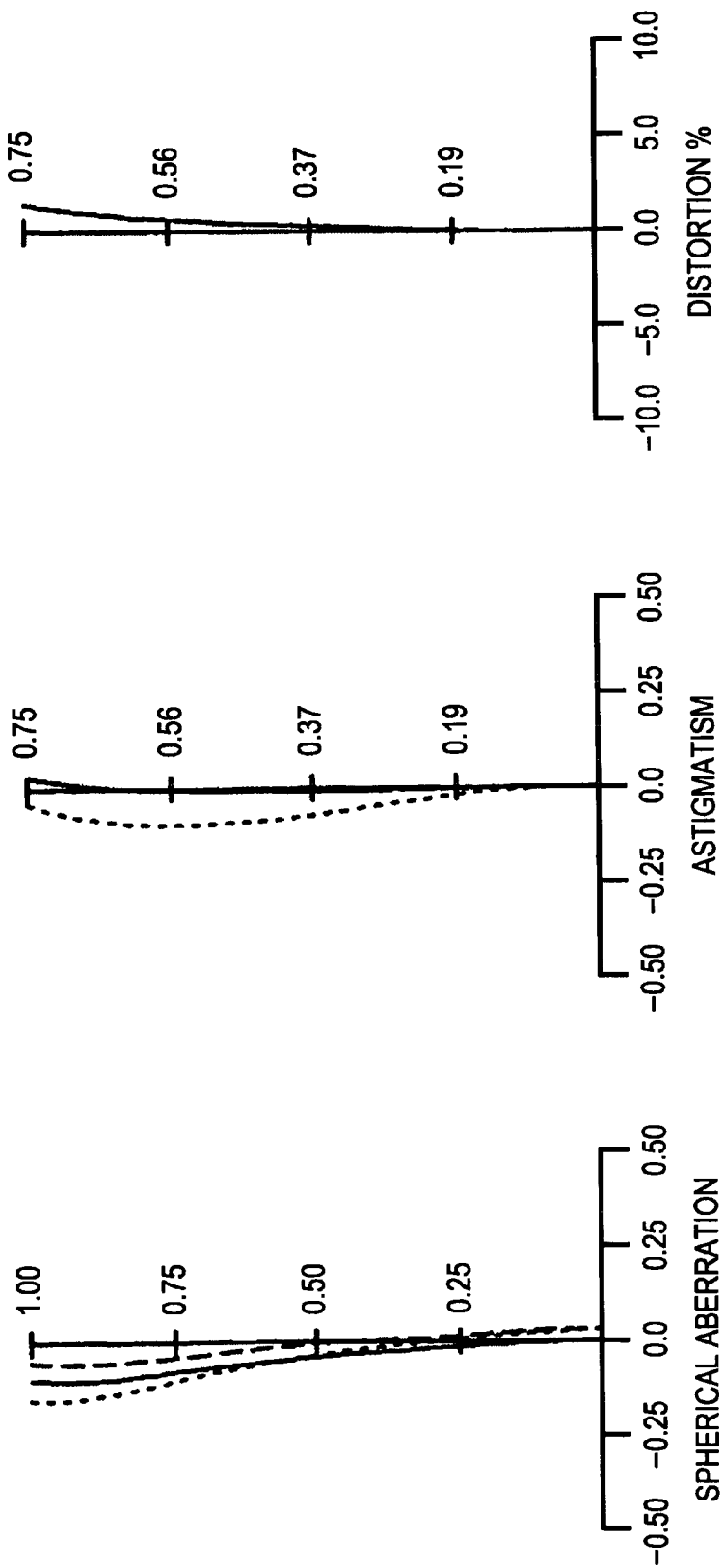
FIG. 5 shows longitudinal aberrations (spherical aberration, astigmatism, and distortion) at an intermediate focal length.
Figure 6:
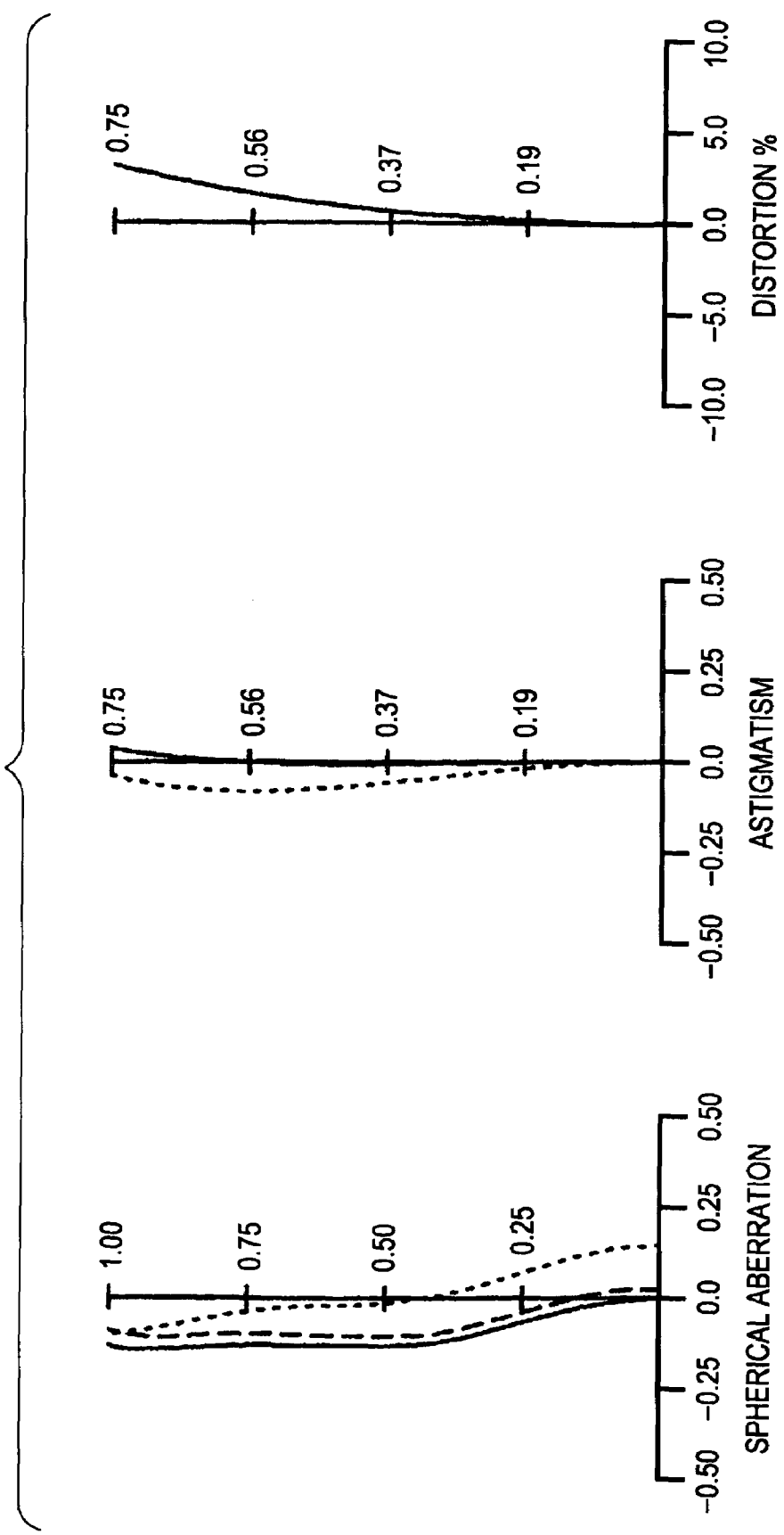
FIG. 6 shows longitudinal aberrations (spherical aberration, astigmatism, and distortion) at a telephoto end.

FIGS. 4 to 6 show aberration diagrams containing a spherical aberration, an astigmatism, and a distortion according to Numerical Example 1. FIG. 4 shows aberrations at the wide-angle end, FIG. 5 shows aberrations at the intermediate focal length, and FIG. 6 shows aberrations at the telephoto end. In a spherical aberration diagram in each of FIGS. 2 to 4, a solid line represents a value for the d-line, a broken line represents a value for the C-line (wavelength=656.3 nm), and a dotted line represents a value for the g-line (wavelength=435.8 nm). In an astigmatism diagram and a distortion diagram, each line represents a value for the d-line. Also, in the astigmatism diagram, a solid line represents a value at a sagittal image plane, and a dotted line represents a value at a meridional image plane.

Figure 7:
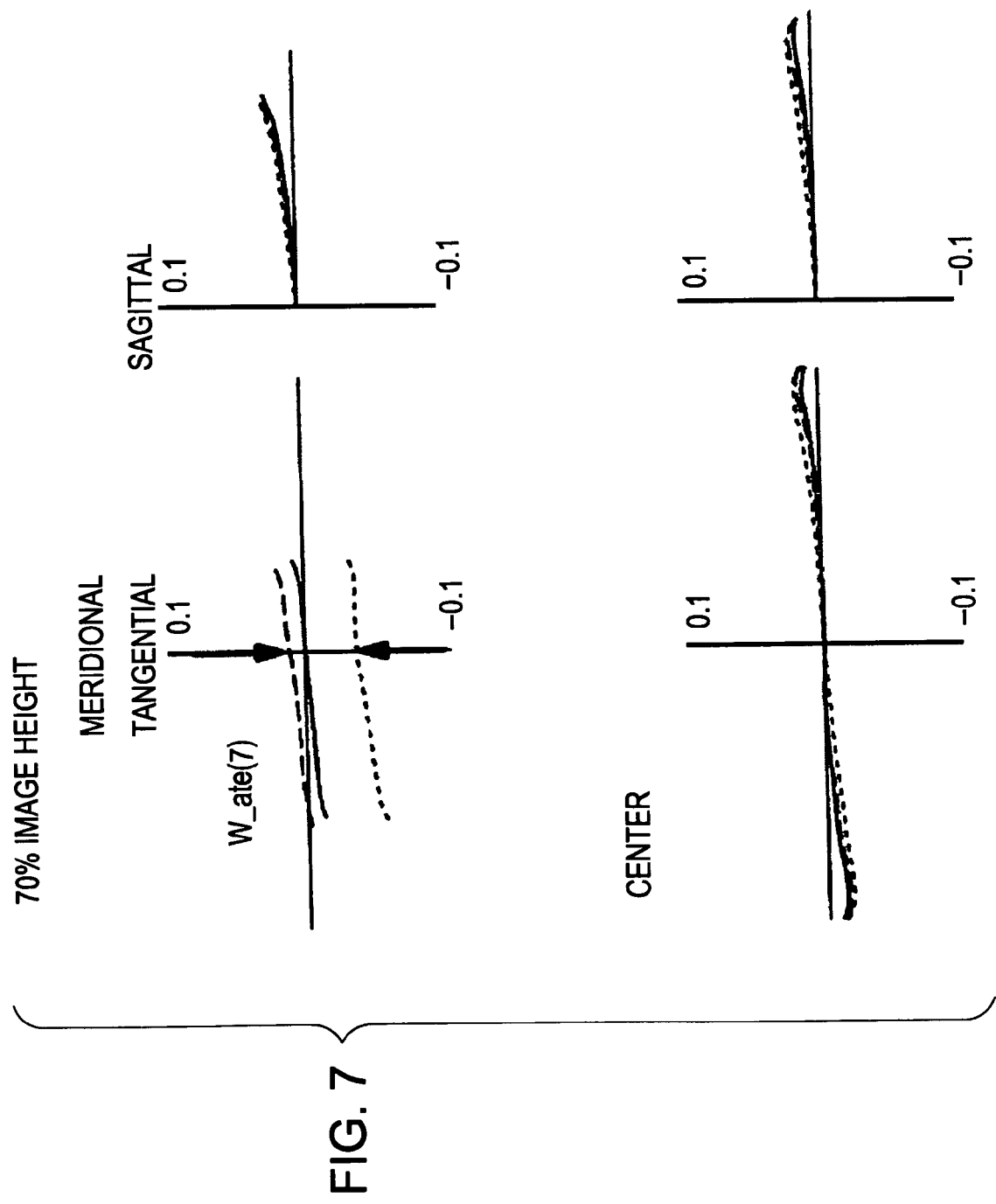
FIG. 7 shows lateral aberrations according to Numerical Example 1 similarly to FIGS. 8 and 9, in particular.
Figure 8:
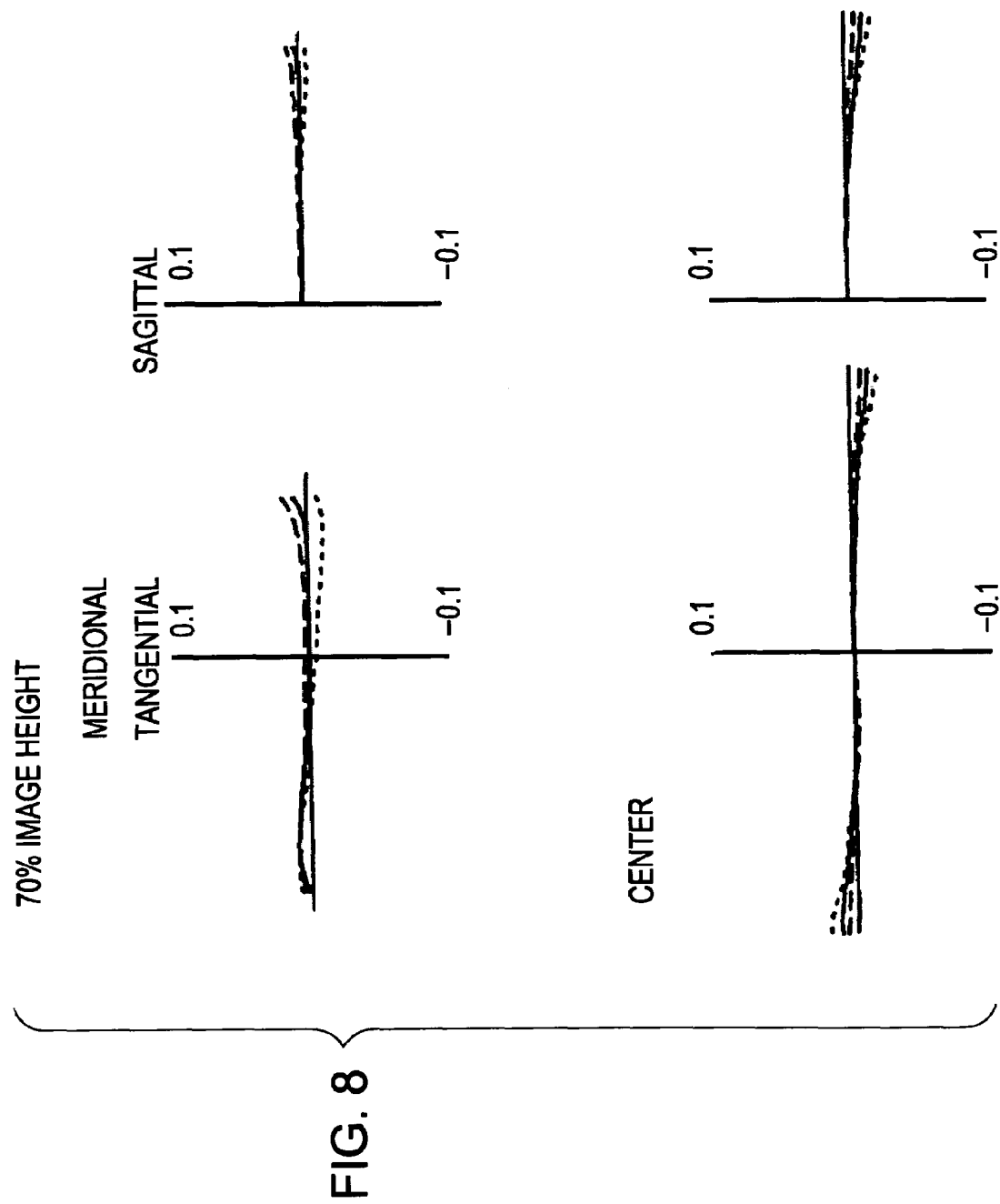
FIG. 8 shows a lateral aberration at the intermediate focal length.
Figure 9:
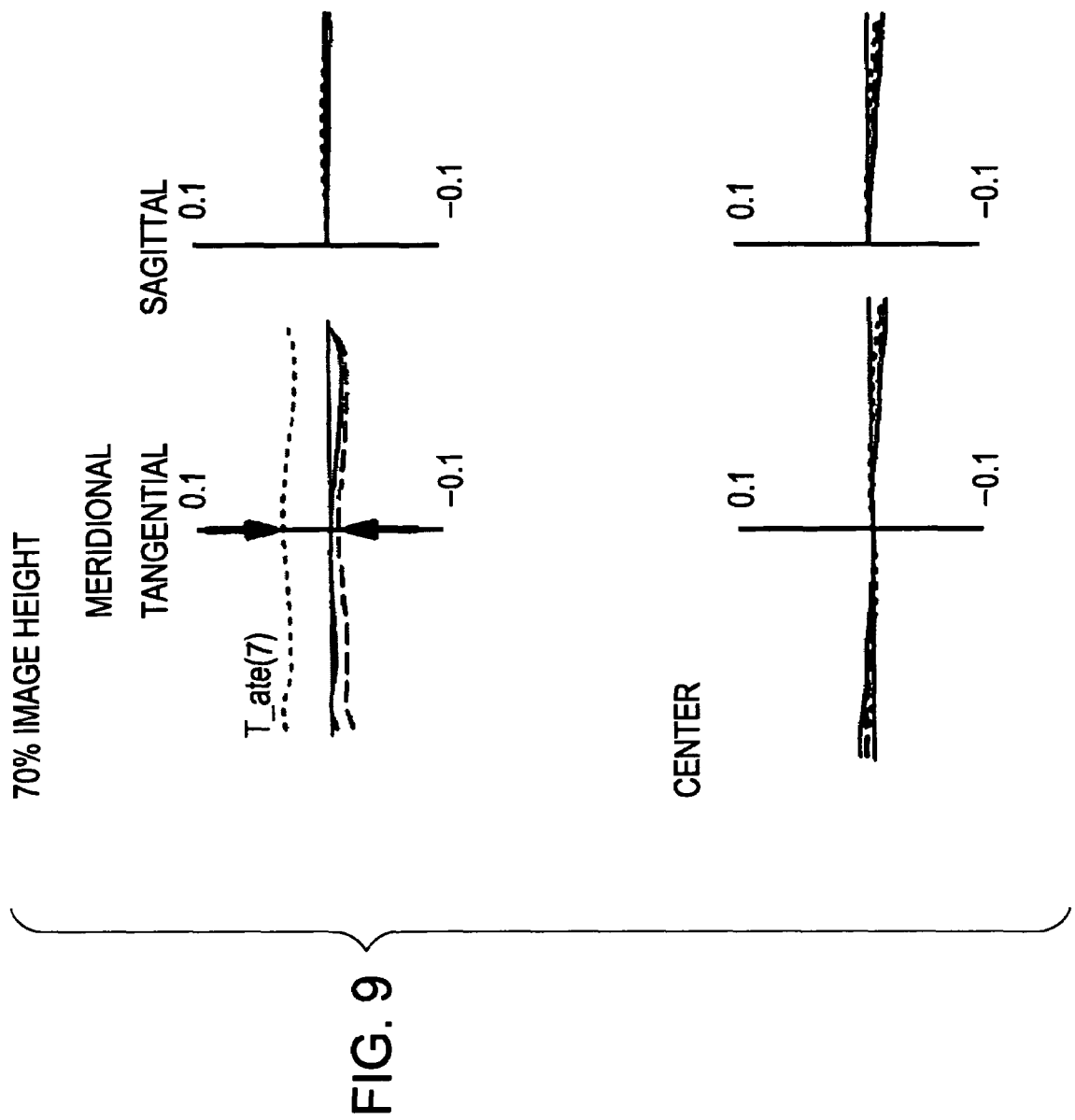
FIG. 9 shows a lateral aberration at the telephoto end.

FIGS. 7 to 9 show lateral aberrations according to Numerical Example 1. FIG. 7 shows lateral aberrations at the wide-angle end, FIG. 8 shows lateral aberrations at the intermediate focal length, and FIG. 9 shows lateral aberrations at the telephoto end. In each figure, an upper portion illustrates lateral aberrations at a 70% image height, and a lower portion illustrates lateral aberrations at the center. A solid line represents a value for the d-line, a broken line represents a value for the C-line, and a dotted line represents a value for the g-line. In the lateral aberration diagrams, the vertical axis represents a distance in an image plane, and the horizontal axis represents a height of a ray at the aperture stop.

As shown in each aberration diagram, in particular, as shown in FIGS. 7 to 9, the chromatic aberrations are corrected in a balanced manner at the wide-angle end and the telephoto end according to Numerical Example 1.

Figure 10:
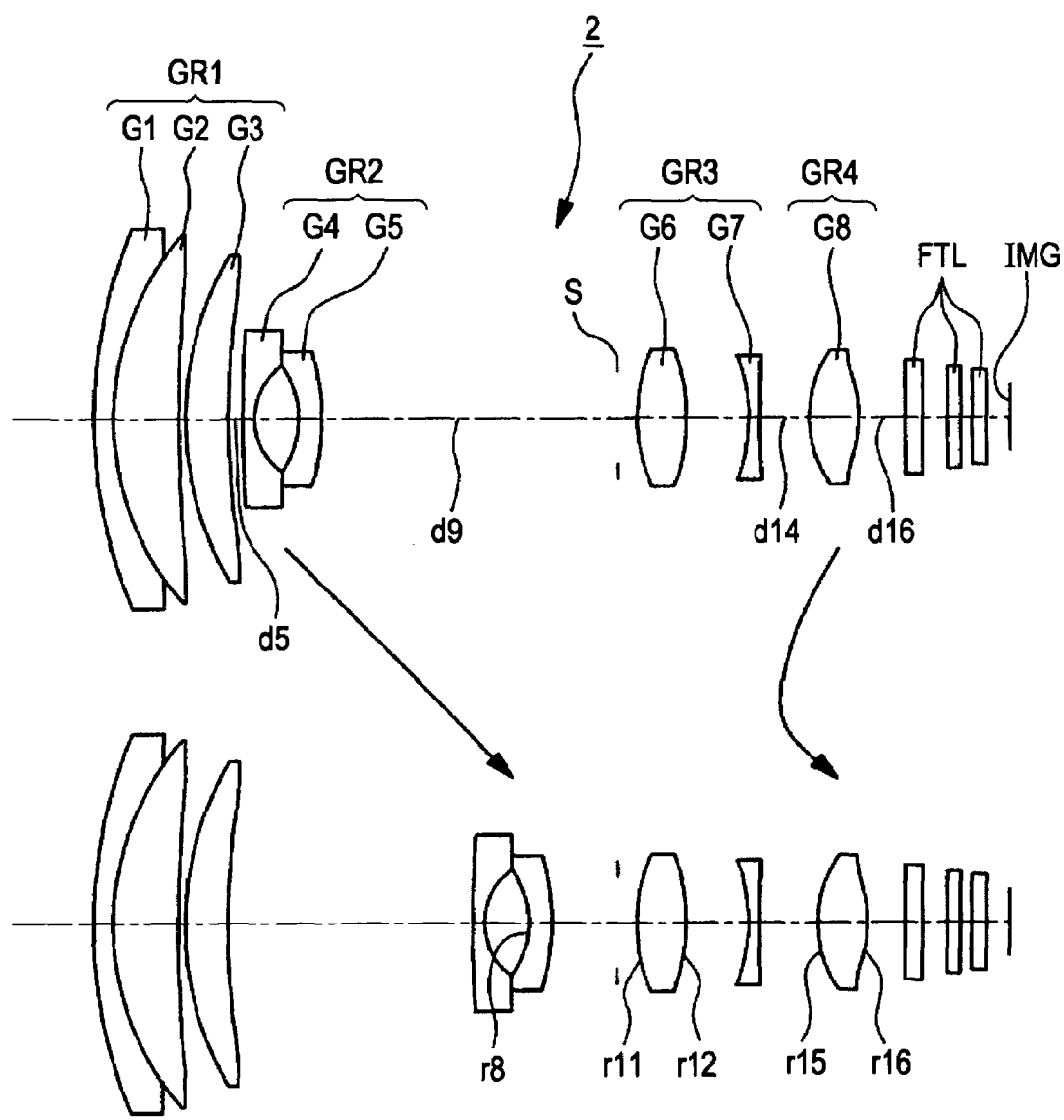
FIG. 10 is an illustration showing a lens arrangement of a zoom lens according to a second embodiment of the present invention.

FIG. 10 shows a lens arrangement of a zoom lens 2 according to a second embodiment of the present invention. An upper portion of FIG. 10 illustrates positions of lens groups at a wide-angle end, and a lower portion of FIG. 10 illustrates positions of the lens groups at a telephoto end.

A zoom lens 2 includes a first lens group GR1 having a positive refractive power, a second lens group GR2 having a negative refractive power, a third lens group GR3 having a positive refractive power, and a fourth lens group GR4 having a positive refractive power, in order from an object side. During zooming from the wide-angle end to the telephoto end, the first lens group GR1 and third lens group GR3 are fixed in an optical-axis direction, the second lens group GR2 moves on the optical axis from the object side to an image side, and the fourth lens group GR4 moves on the optical axis from the image side to the object side, and then to the image side.

The first lens group GR1 includes a cemented lens element composed of a negative lens element G1 and a positive lens element G2, and a positive lens element G3, in order from the object side to the image side. The second lens group GR2 includes a negative lens element G4, and a negative lens element G5 made of plastic and having an aspherical surface on an image-side surface, in order from the object side to the image side. The third lens group GR3 includes a positive lens element G6 having aspherical surfaces on both surfaces, and a negative lens element G7, in order from the object side to the image side. The fourth lens group GR4 includes a positive lens element G8 made of plastic and having aspherical surfaces on both surfaces. An aperture stop S is arranged on the object side of the third lens group GR3. Optical filters FLT are inserted between the fourth lens group GR4 and an image plane IMG.

Table 6 shows lens data according to Numerical Example 2 in which specific numerical values are applied to the zoom lens 2 according to the second embodiment.

TABLE 6

| i | ri | ASP | di | ni | vi |
|---|------|-----|----------|---------|-------|
| 1 | 19.883 |   | 0.650 | 1.84666 | 23.78 |
| 2 | 10.415 |   | 2.258 | 1.75700 | 47.71 |
| 3 | 76.996 |   | 0.200 |   |   |
| 4 | 11.994 |   | 1.500 | 1.72916 | 54.67 |
| 5 | 36.040 |   | variable |   |   |
| 6 | 94.124 |   | 0.400 | 1.48914 | 70.44 |
| 7 | 2.535 |   | 1.481 |   |   |
| 8 | −3.199 | ASP | 0.800 | 1.52692 | 56.24 |
| 9 | −9.019 |   | variable |   |   |
| STOP | INF |   | 0.700 |   |   |
| 11 | 5.081 | ASP | 1.699 | 1.52692 | 56.24 |
| 12 | −8.000 | ASP | 2.201 |   |   |
| 13 | −5.943 |   | 0.400 | 1.92286 | 20.88 |
| 14 | 62.695 |   | variable |   |   |
| 15 | 4.657 | ASP | 1.644 | 1.52692 | 56.24 |
| 16 | −4.967 | ASP | variable |   |   |
| 17 | INF |   | 1.530 | 1.55440 | 60.00 |
| 18 | INF |   | 2.100 |   |   |
| IMG | INF |   | 0.000 |   |   |

During zooming from the wide-angle end to the telephoto end, a distance d5 between the first lens group GR1 and the second lens group GR2, a distance d9 between the second lens group GR2 and the third lens group GR3 (aperture stop S), a distance d14 between the third lens group GR3 and the fourth lens group GR4, and a distance d16 between the fourth lens group GR4 and the optical filters FLT are varied. Table 7 shows values of these distances as well as a focal length "f", an F-number "Fno", and a half angle of view "ω", according to Numerical Example 2 respectively at a wide-angle end (f=2.33), an intermediate focal length (f=7.17), and a telephoto end (f=20.13).

TABLE 7

| f | 2.33 | 7.17 | 20.13 |
|------|--------|-------|-------|
| Fno. | 1.92 | 2.02 | 1.90 |
| ω | 25.77 | 8.91 | 3.20 |
| d5 | 0.550 | 5.628 | 8.628 |
| d9 | 10.434 | 5.356 | 2.356 |
| d14 | 1.740 | 0.848 | 2.022 |
| d16 | 1.682 | 2.574 | 1.400 |

An object-side surface (r8) of the negative lens element G5 of the second lens group GR2, both surfaces (r11, r12) of the positive lens element G6 of the third lens group GR3, and both surfaces (r15, r16) of the positive lens element G8 of the fourth lens group GR4 are aspherical surfaces. Table 8 shows aspherical coefficients A4, A6, A8, and A10 as well as a conic constant K for each of 4th, 6th, 8th, and 10th surfaces according to Numerical Example 2.

TABLE 8

| i | K | A | B | C | D |
|---|---|---|---|---|---|
| 8 | 0.0000E+00 | 3.8260E−03 | 7.7780E−04 | −1.7263E−04 | 1.6912E−05 |
| 11 | 0.0000E+00 | −1.2072E−03 | −2.9077E−04 | 2.8944E−06 | −1.2918E−07 |
| 12 | 0.0000E+00 | 2.6106E−04 | −3.5271E−04 | 1.5260E−05 | −2.5539E−07 |
| 15 | 0.0000E+00 | −1.6690E−03 | 1.5838E−04 | −4.2480E−05 | 1.7461E−05 |
| 16 | 0.0000E+00 | 4.1128E−03 | 2.2123E−04 | −8.3425E−05 | 2.5627E−05 |

Table 9 shows values corresponding to W_ate(X), T_ate (X), and Conditional Expressions (1) and (2) respectively at a 40% image height, a 70% image height, and a 100% image height according to Numerical Example 2.

TABLE 9

| | | Image pickup element diagonal length Himg | | 2.25 | |
|---|---|---|---|---|---|
| | Image height X | W_ate (X) | T_ate (X) | Conditional Expression (1) | Conditional Expression (2) |
| Numerical Example 2 | 40% | −0.0096 | 0.0074 | −1.31 | — |
| | 70% | −0.0164 | 0.0122 | −1.35 | — |
| | 100% | −0.0212 | 0.0151 | −1.41 | 0.009 |

Table 10 shows an initial surface (i) and a focal length (f) of each lens group.

TABLE 10

| | Initial surface | Focal length |
|---|---|---|
| First group | 1 | 15.534 |
| Second group | 6 | −3.216 |
| Third group | 11 | 14.005 |
| Fourth group | 15 | 4.847 |

Figure 11:
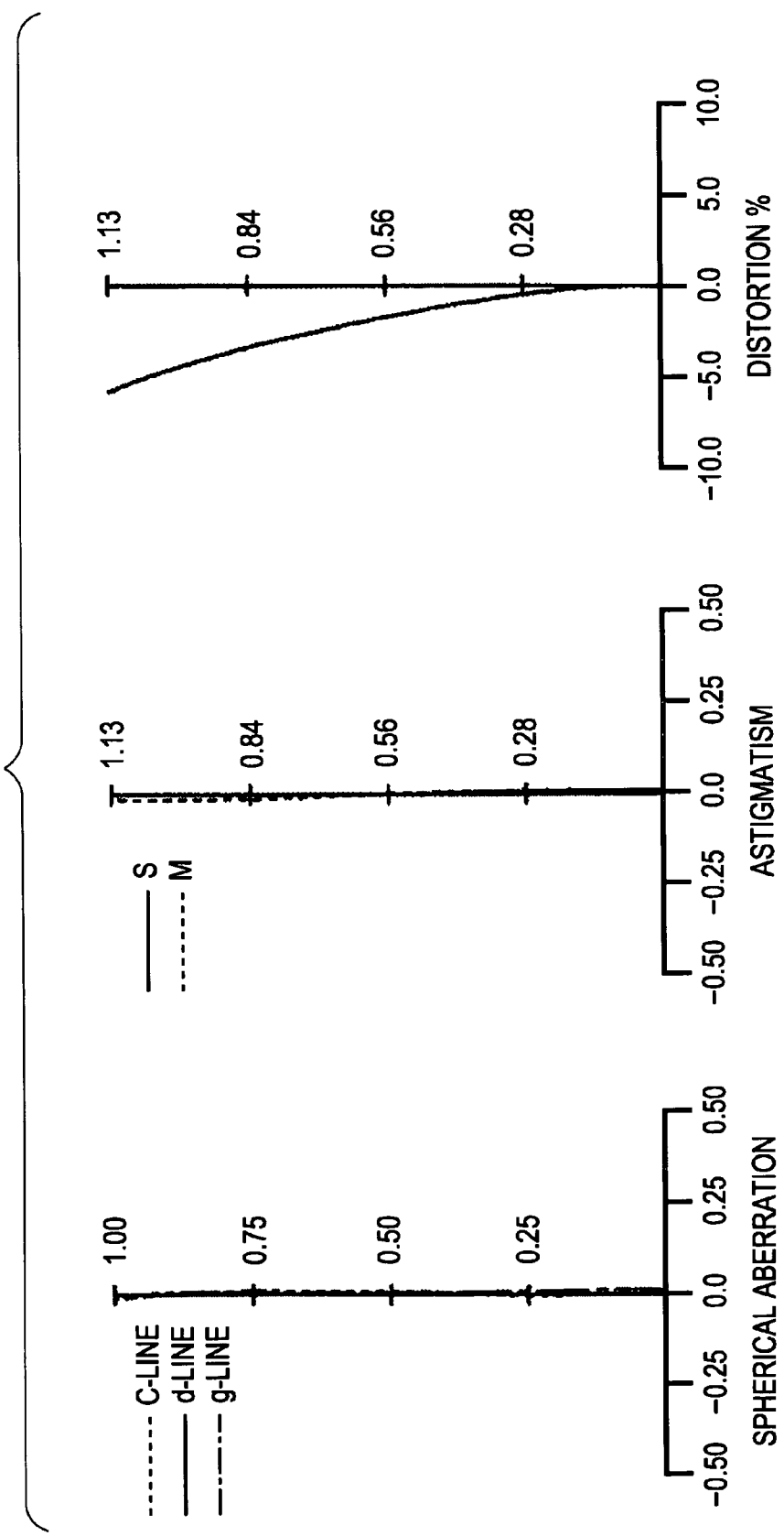
FIG. 11 shows aberration diagrams according to Numerical Example 2 in which, similarly to FIGS. 12 and 13, specific numerical values are applied to the second embodiment, in particular.
Figure 12:
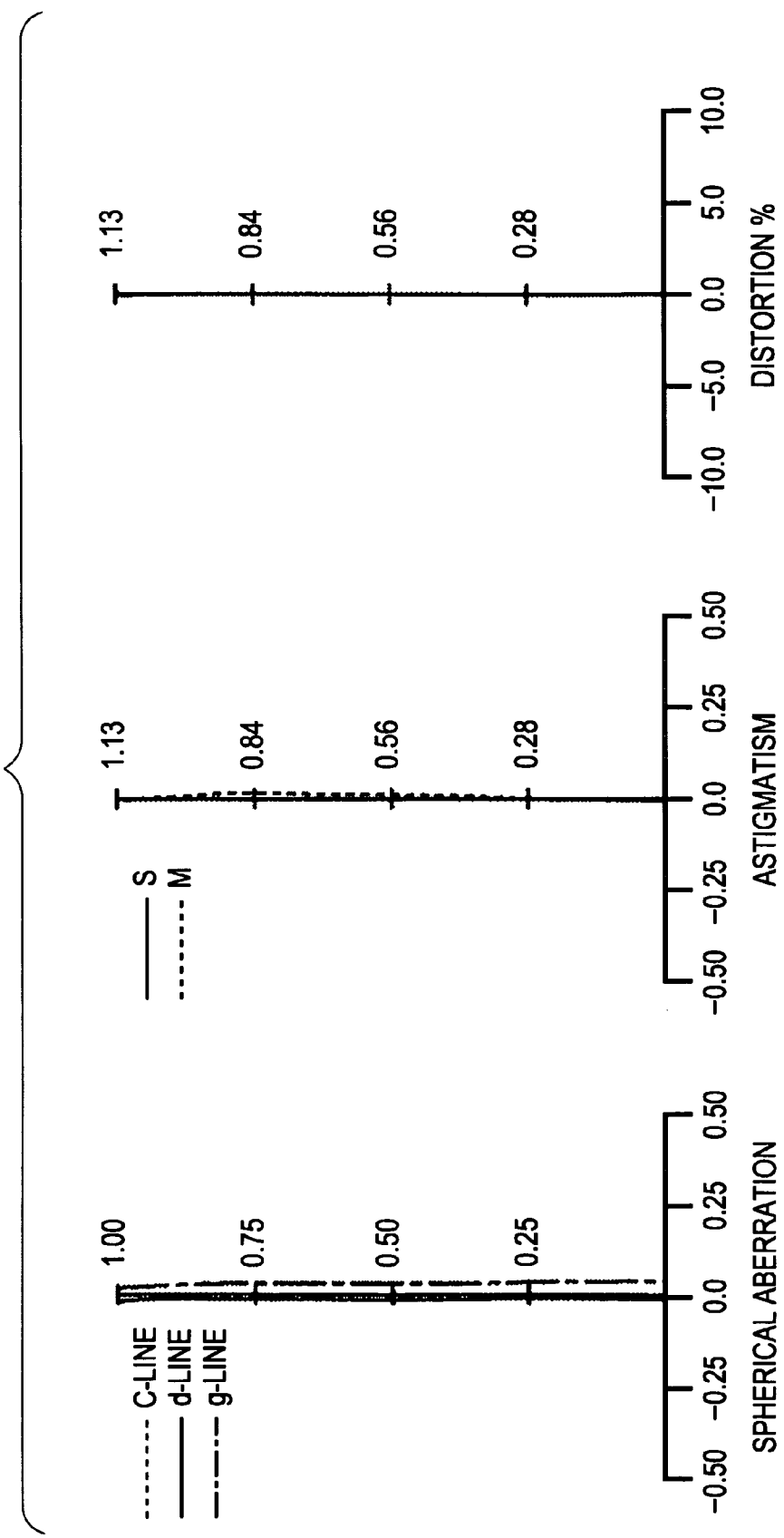
FIG. 12 shows longitudinal aberrations (spherical aberration, astigmatism, and distortion) at an intermediate focal length.
Figure 13:
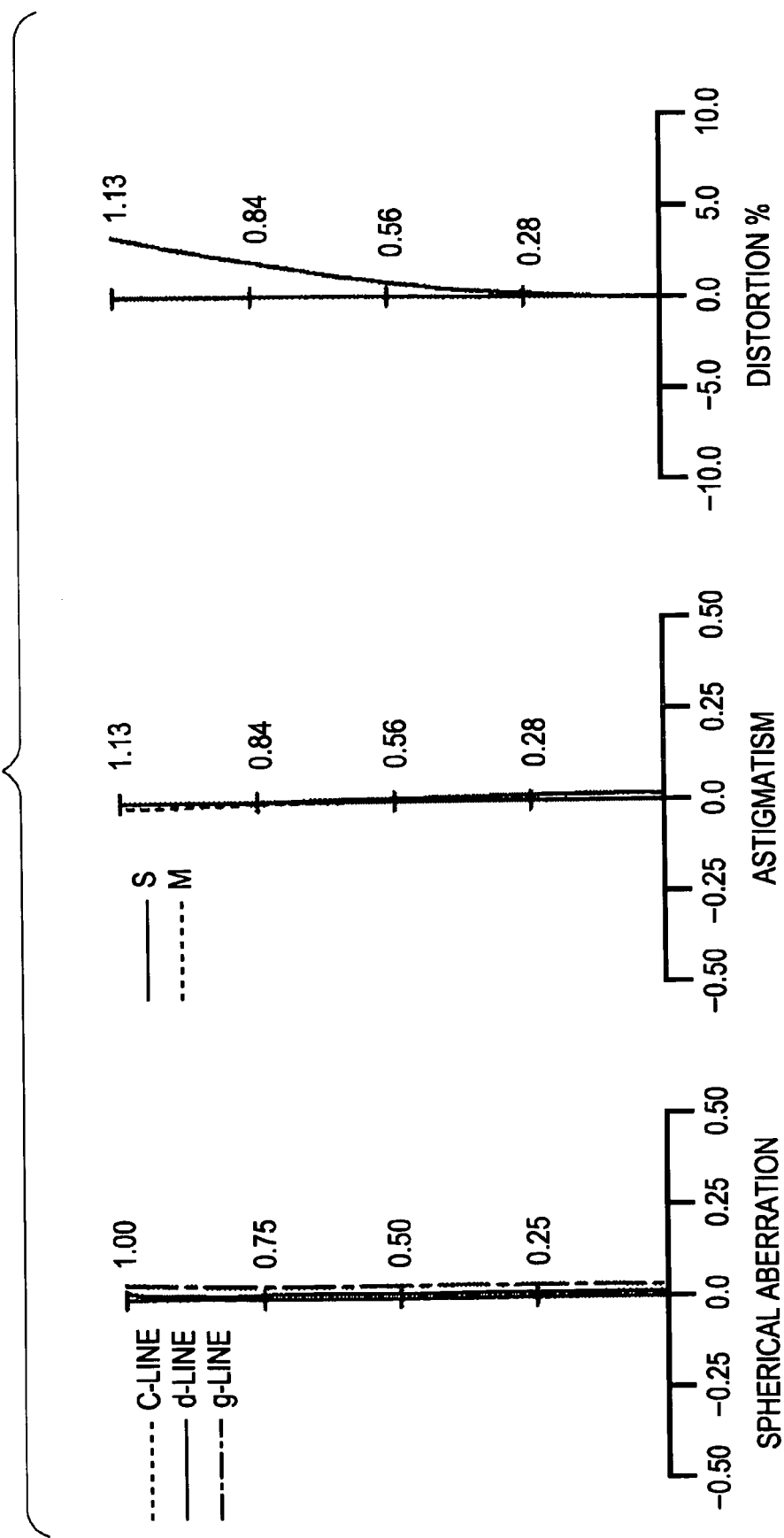
FIG. 13 shows longitudinal aberrations (spherical aberration, astigmatism, and distortion) at a telephoto end.

FIGS. 11 to 13 show aberration diagrams containing a spherical aberration, an astigmatism, and a distortion according to Numerical Example 2. FIG. 11 shows aberrations at the wide-angle end, FIG. 12 shows aberrations at the intermediate focal length, and FIG. 13 shows aberrations at the telephoto end. In a spherical aberration diagram in each of FIGS. 11 to 13, a solid line represents a value for the d-line, a broken line represents a value for the C-line, and a one-dot chain line represents a value for the g-line. In an astigmatism diagram and a distortion diagram, each line represents a value for the d-line. Also, in the astigmatism diagram, a solid line represents a value at a sagittal image plane, and a dotted line represents a value at a meridional image plane.

Figure 14:
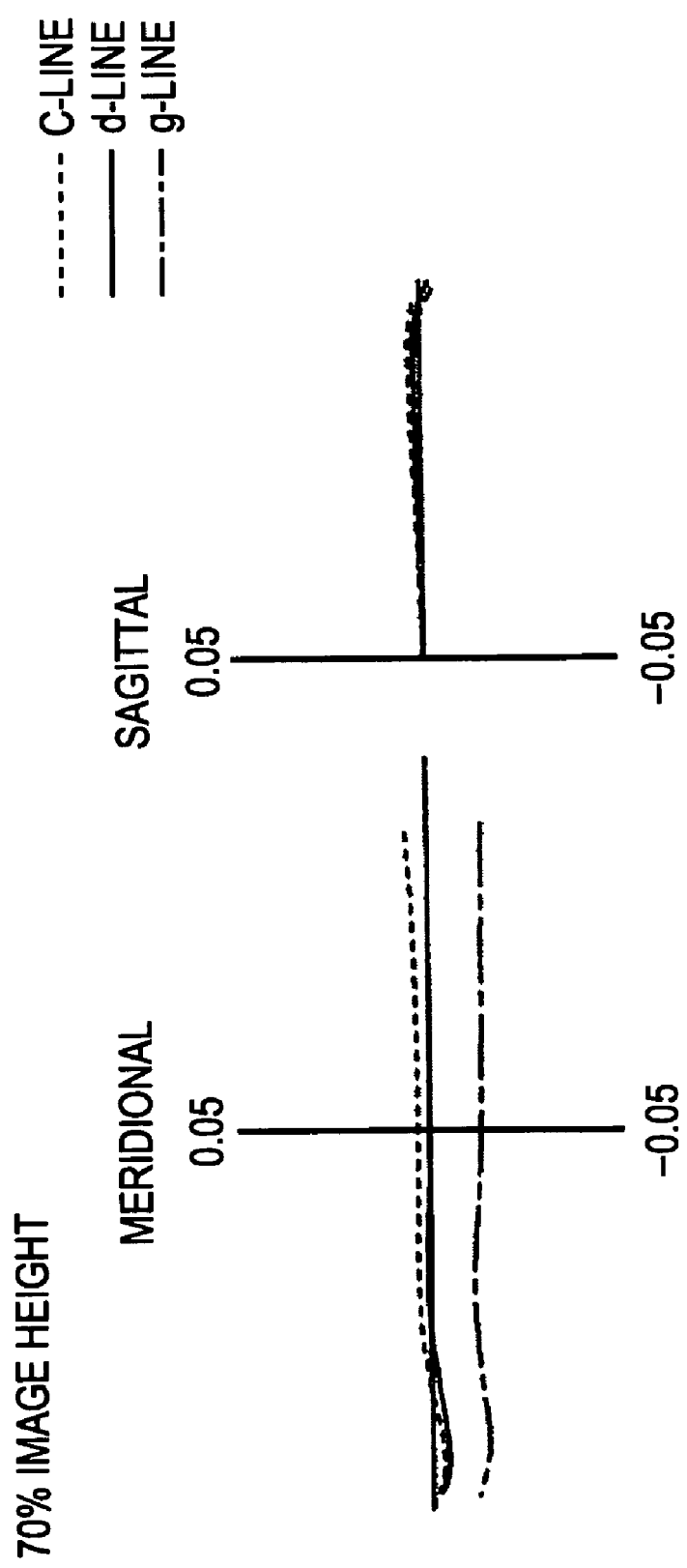
FIG. 14 shows lateral aberrations according to Numerical Example 2 similarly to FIGS. 15 and 16, in particular.
Figure 15:
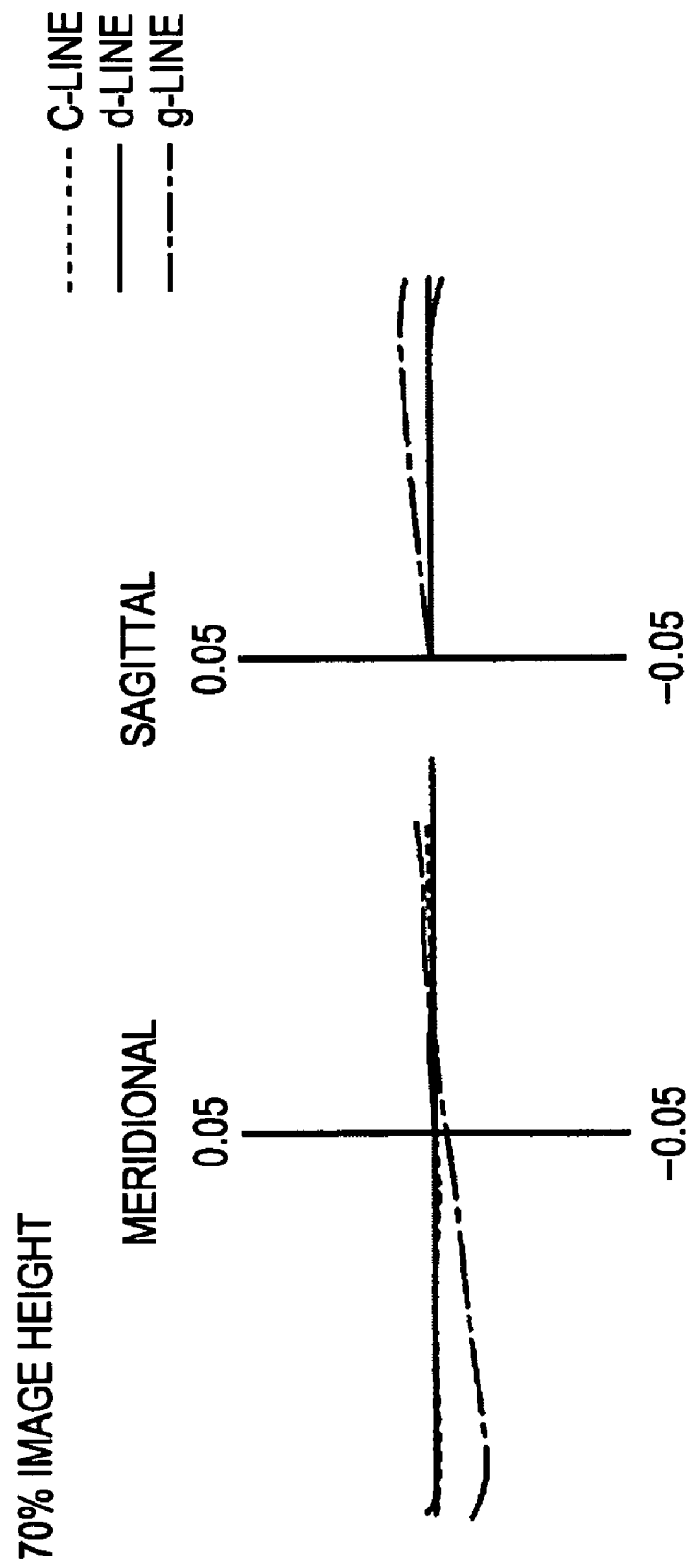
FIG. 15 shows a lateral aberration at the intermediate focal length.
Figure 16:
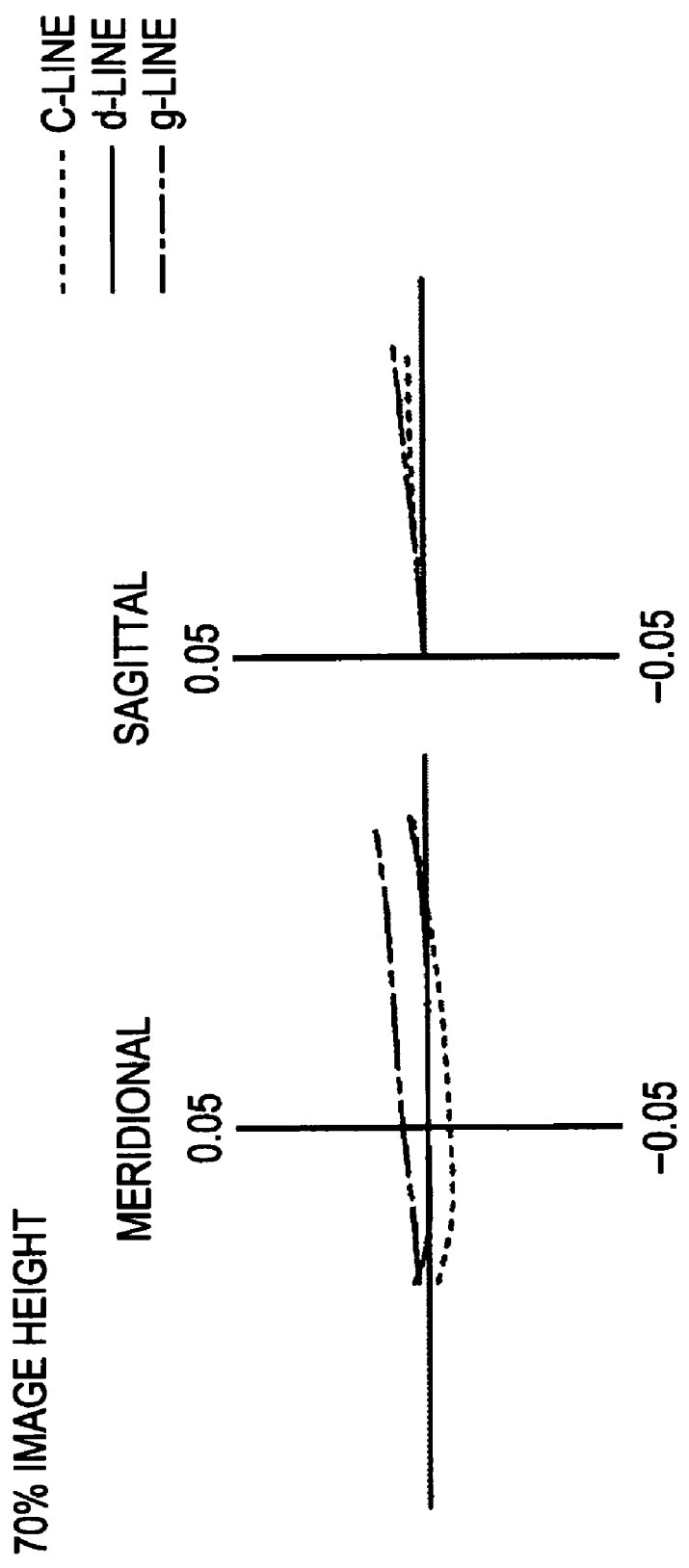
FIG. 16 shows a lateral aberration at the telephoto end.

FIGS. 14 to 16 show lateral aberrations at a 70% image height according to Numerical Example 2. FIG. 14 shows lateral aberrations at the wide-angle end, FIG. 15 shows lateral aberrations at the intermediate focal length, and FIG. 16 shows lateral aberrations at the telephoto end. A solid line represents a value for the d-line, a broken line represents a value for the C-line, and a one-dot chain line represents a value for the g-line. In the lateral aberration diagrams, the vertical axis represents a distance in an image plane, and the horizontal axis represents a height of a ray at the aperture stop.

As shown in each aberration diagram, in particular, as shown in FIGS. 14 to 16, the chromatic aberrations are corrected in a balanced manner at the wide-angle end and the telephoto end according to Numerical Example 2.

Figure 17:
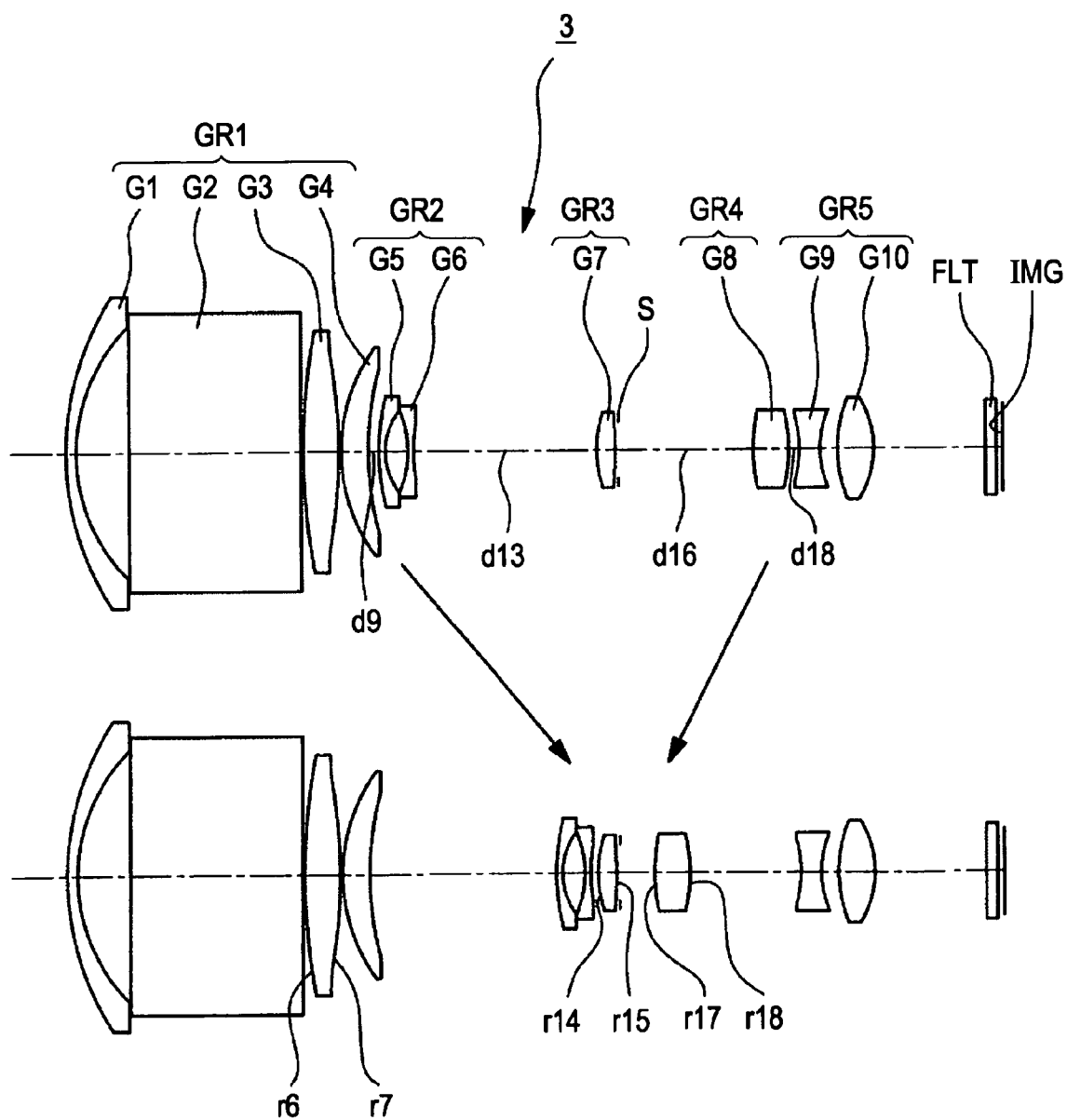
FIG. 17 is an illustration showing a lens arrangement of a zoom lens according to a third embodiment of the present invention.

FIG. 17 shows a lens arrangement of a zoom lens 3 according to a third embodiment of the present invention.

A zoom lens 3 includes a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power, in order from an object side. During zooming from the wide-angle end to the telephoto end, the first lens group GR1, third lens group GR3, and fifth lens group GR5 are fixed in an optical-axis direction, the second lens group GR2 moves on the optical axis from the object side to an image side, and the fourth lens group GR4 moves on the optical axis from the image side to the object side.

The first lens group GR1 includes a negative lens element G1, a right-angle prism G2 for bending the optical axis by 90°, a positive lens element G3 having aspherical surfaces on both surfaces, and a positive lens element G4, in order from the object side to the image side. The second lens group GR2 includes a negative lens element G5, and a negative lens element G6, in order from the object side to the image side. The third lens group GR3 includes a positive lens element G7 made of plastic and having aspherical surfaces on both surfaces. The fourth lens group GR4 includes a positive lens element G8 having aspherical surfaces on both surfaces. The fifth lens group GR5 includes a negative lens element G9, and a positive lens element G10, in order from the object side to the image side. An aperture stop S is arranged on the image side of the third lens group GR3. An optical filter FLT is inserted between the fifth lens group GR5 and an image plane IMG.

Table 11 shows lens data according to Numerical Example 3 in which specific numerical values are applied to the zoom lens 3 according to the third embodiment.

TABLE 11

| i | ri | ASP | di | ni | vi |
|---|---|---|---|---|---|
| 1 | 25.584 | | 0.880 | 1.92286 | 20.88 |
| 2 | 16.343 | | 4.362 | | |
| 3 | INF | | 7.250 | 1.90366 | 31.32 |
| 4 | INF | REF | 7.250 | 1.90366 | 31.32 |
| 5 | INF | | 0.200 | | |
| 6 | 60.382 | ASP | 3.000 | 1.76802 | 49.24 |
| 7 | −60.165 | ASP | 0.100 | | |
| 8 | 15.789 | | 2.393 | 1.61800 | 63.39 |
| 9 | 33.491 | | Variable | | |
| 10 | 26.567 | | 0.500 | 1.88300 | 40.80 |
| 11 | 7.622 | | 1.800 | | |
| 12 | −10.096 | | 0.500 | 1.72916 | 54.67 |
| 13 | 32.374 | | Variable | | |
| 14 | 11.108 | ASP | 1.500 | 1.52470 | 56.24 |
| 15 | −27.399 | ASP | 0.300 | | |
| STOP | INF | | Variable | | |
| 17 | 17.245 | ASP | 2.868 | 1.76802 | 49.24 |
| 18 | −21.099 | ASP | Variable | | |
| 19 | −12.219 | | 1.776 | 1.84666 | 23.78 |
| 20 | 8.771 | | 1.500 | | |
| 21 | 14.415 | | 3.003 | 1.61800 | 63.39 |
| 22 | −8.798 | | 9.420 | | |
| 23 | INF | | 0.900 | 1.51680 | 64.20 |
| 24 | INF | | 0.600 | | |
| IMG | INF | | 0.000 | | |

During zooming from the wide-angle end to the telephoto end, a distance d9 between the first lens group GR1 and the second lens group GR2, a distance d13 between the second lens group GR2 and the third lens group GR3, a distance d16 between the third lens group GR3 (aperture stop S) and the fourth lens group GR4, and a distance d18 between the fourth lens group GR4 and the fifth lens group GR5 are varied. Table 12 shows values of these distances as well as a focal length "f", an F-number "Fno", and a half angle of view "ω", according to Numerical Example 3 respectively at a wide-angle end (f=5.50), an intermediate focal length (f=16.14), and a telephoto end (f=44.00).

TABLE 12

| f    | 5.50   | 16.14  | 44.00  |
|------|--------|--------|--------|
| Fno. | 3.98   | 4.12   | 5.13   |
| ω    | 34.55  | 12.71  | 4.67   |
| d9   | 1.000  | 10.832 | 15.800 |
| d13  | 15.601 | 5.769  | 0.800  |
| d16  | 11.297 | 7.077  | 2.763  |
| d18  | 1.000  | 5.220  | 9.535  |

Both surfaces (r6, r7) of the positive lens element G3 of the first lens group GR1, both surfaces (r14, r15) of the plastic positive lens element G7 of the third lens group GR3, and both surfaces (r17, r18) of the positive lens element G8 of the fourth lens group GR4 are aspherical surfaces. Table 13 shows aspherical coefficients A4, A6, A8, and A10 as well as a conic constant K for each of 4th, 6th, 8th, and 10th surfaces according to Numerical Example 3.

TABLE 13

| i  | K          | A           | B           | C           | D          |
|----|------------|-------------|-------------|-------------|------------|
| 6  | 0.0000E+00 | −4.0969E−05 | 1.1481E−06  | −1.2631E−08 | 6.2319E−11 |
| 7  | 0.0000E+00 | −4.8486E−05 | 1.1708E−06  | −1.3377E−08 | 6.6728E−11 |
| 14 | 0.0000E+00 | 4.6611E−05  | −1.1984E−05 | 2.7155E−07  | 6.2792E−08 |
| 15 | 0.0000E+00 | 2.0486E−04  | −6.7357E−06 | −4.5839E−07 | 9.4235E−08 |
| 17 | 0.0000E+00 | −1.6040E−04 | −2.2829E−06 | −7.6631E−07 | 5.5756E−08 |
| 18 | 0.0000E+00 | 2.8303E−07  | −6.5476E−06 | −2.7783E−08 | 1.5501E−08 |

Table 14 shows values corresponding to W_ate(X), T_ate(X), and Conditional Expressions (1) and (2) respectively at a 40% image height, a 70% image height, and a 100% image height according to Numerical Example 3.

TABLE 14

| | Image pickup element diagonal length | | | | |
|---|---|---|---|---|---|
| | Himg | | 7.2 | | |
| | Image height X | W_ate (X) | T_ate (X) | Conditional Expression (1) | Conditional Expression (2) |
| Numerical Example 3 | 40%  | −0.0069 | 0.0100 | −0.69 | —     |
|                     | 70%  | −0.0113 | 0.0176 | −0.65 | —     |
|                     | 100% | −0.0153 | 0.0246 | −0.62 | 0.008 |

Table 15 shows an initial surface (i) and a focal length (f) of each lens group.

TABLE 15

|              | Initial surface | Focal length |
|--------------|-----------------|--------------|
| First group  | 1               | 25.732       |
| Second group | 10              | −5.222       |
| Third group  | 14              | 15.204       |
| Fourth group | 17              | 12.710       |
| Fifth group  | 19              | −125.755     |

Figure 18:
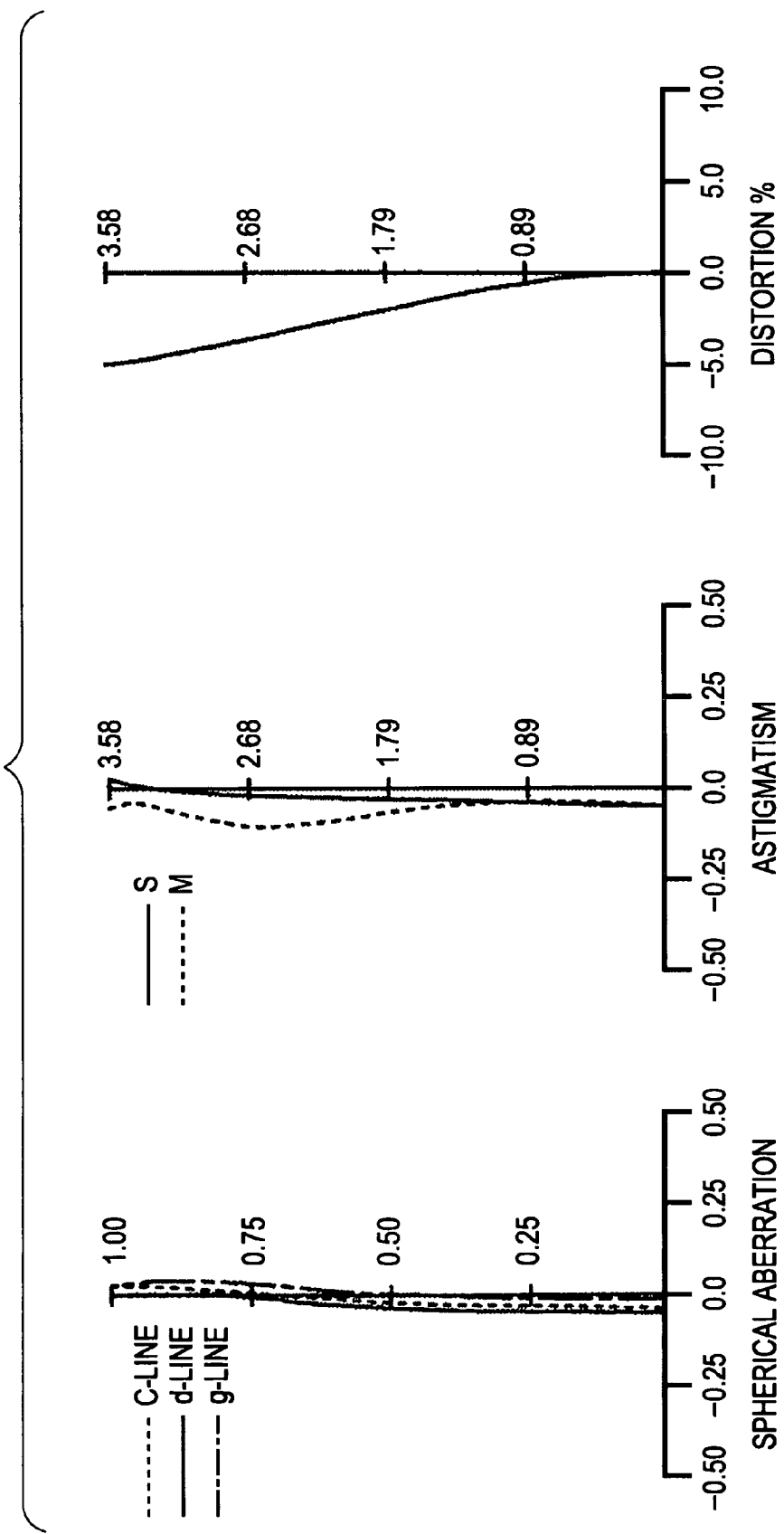
FIG. 18 shows aberration diagrams according to Numerical Example 3 in which, similarly to FIGS. 19 and 20, specific numerical values are applied to the third embodiment, in particular.
Figure 19:
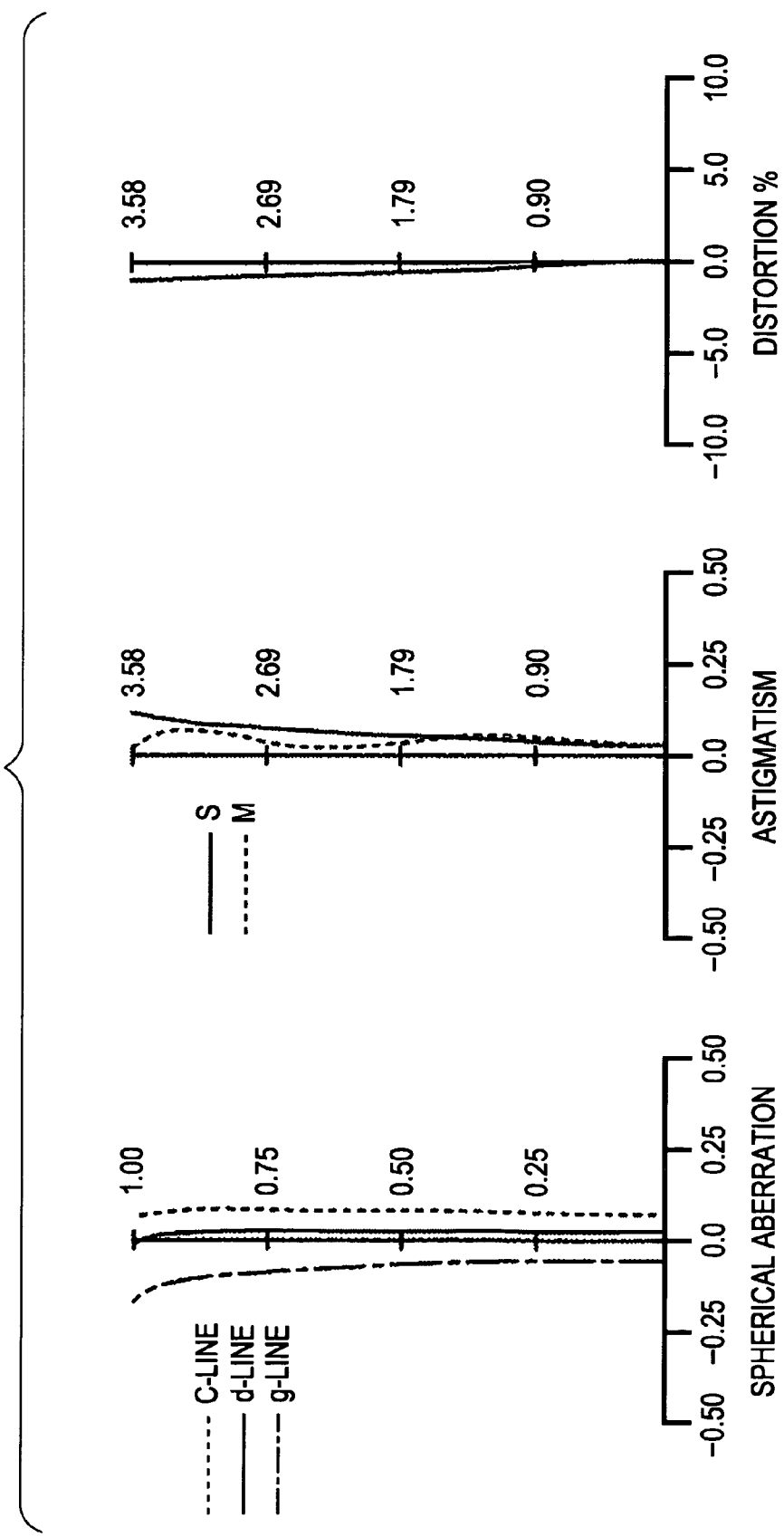
FIG. 19 shows longitudinal aberrations (spherical aberration, astigmatism, and distortion) at an intermediate focal length.
Figure 20:
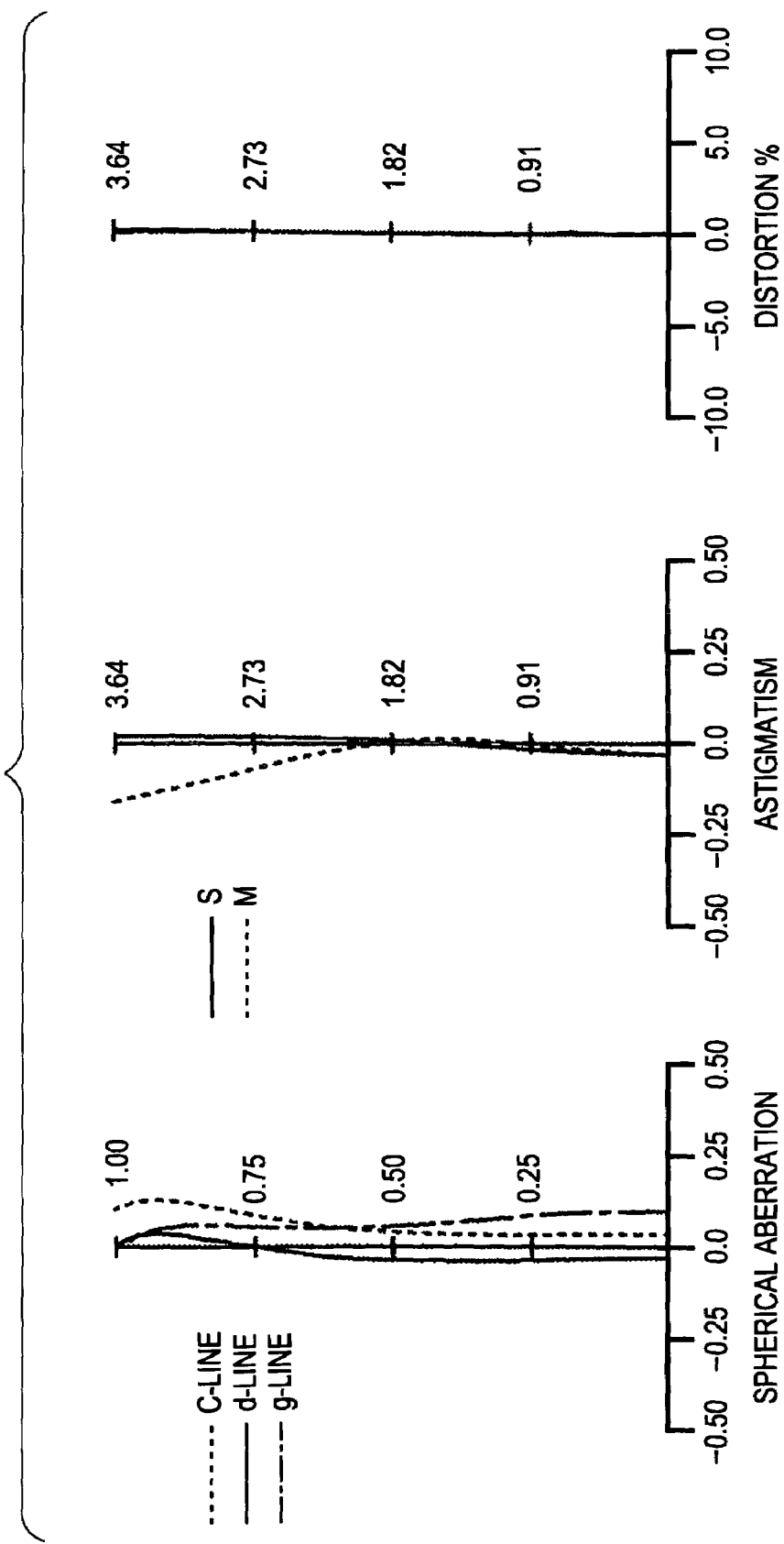
FIG. 20 shows longitudinal aberrations (spherical aberration, astigmatism, and distortion) at a telephoto end.

FIGS. 18 to 20 show aberration diagrams containing a spherical aberration, an astigmatism, and a distortion according to Numerical Example 3. FIG. 18 shows aberrations at the wide-angle end, FIG. 19 shows aberrations at the intermediate focal length, and FIG. 20 shows aberrations at the telephoto end. In a spherical aberration diagram in each of FIGS. 18 to 20, a solid line represents a value for the d-line, a broken line represents a value for the C-line, and a one-dot chain line represents a value for the g-line. In an astigmatism diagram and a distortion diagram, each line represents a value for the d-line. Also, in the astigmatism diagram, a solid line represents a value at a sagittal image plane, and a dotted line represents a value at a meridional image plane.

Figure 21:
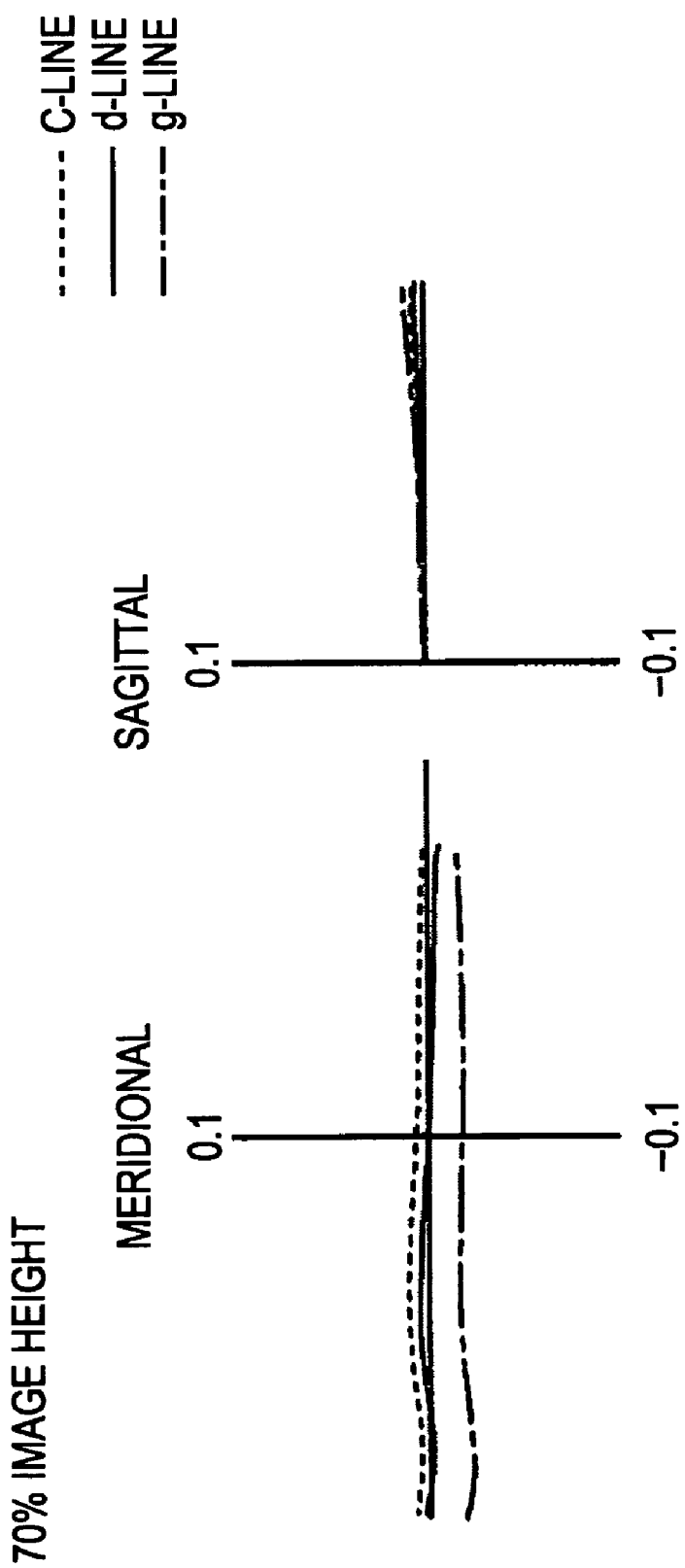
FIG. 21 shows lateral aberrations according to Numerical Example 3 similarly to FIGS. 22 and 23, in particular.
Figure 22:
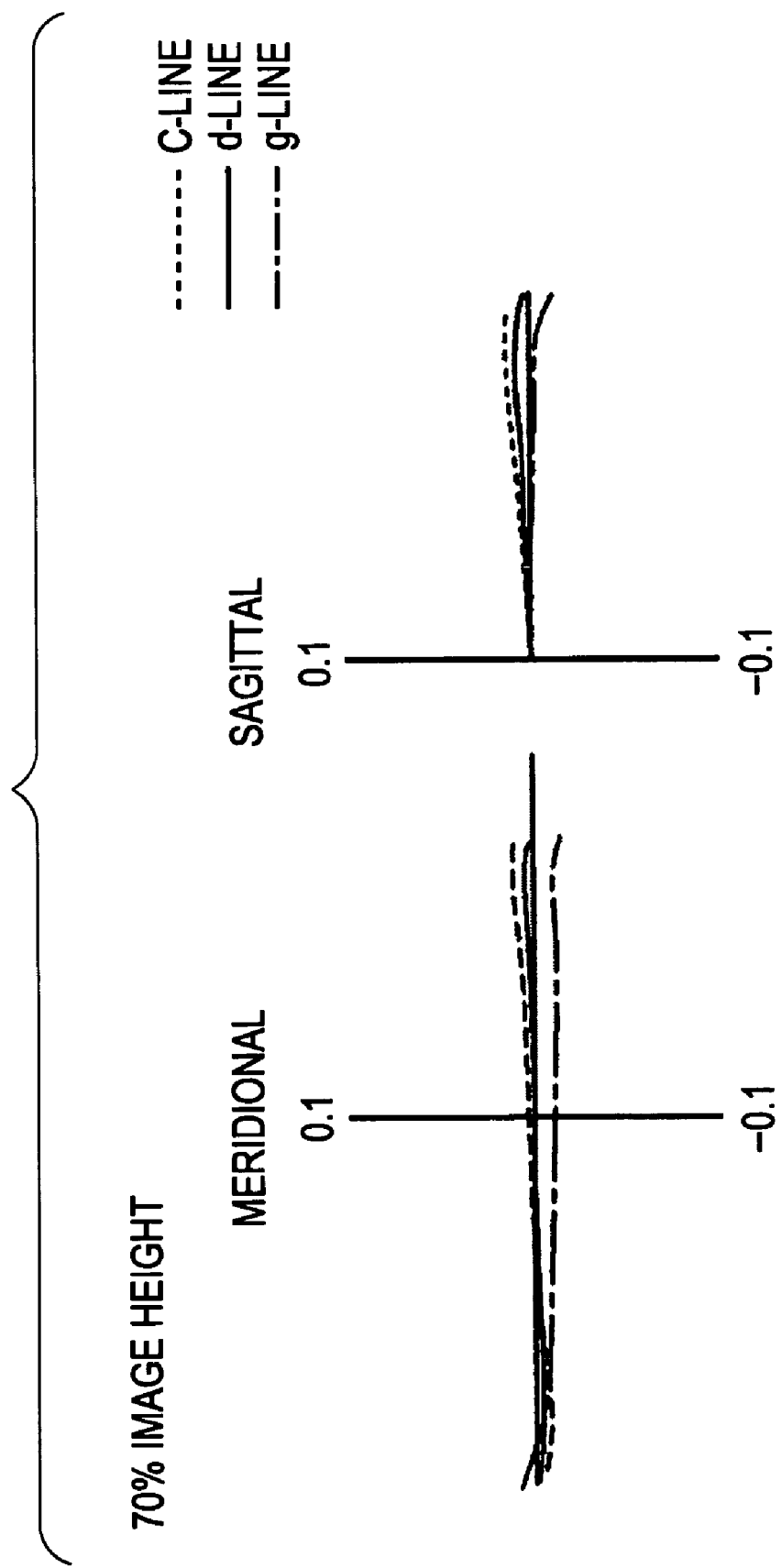
FIG. 22 shows a lateral aberration at the intermediate focal length.
Figure 23:
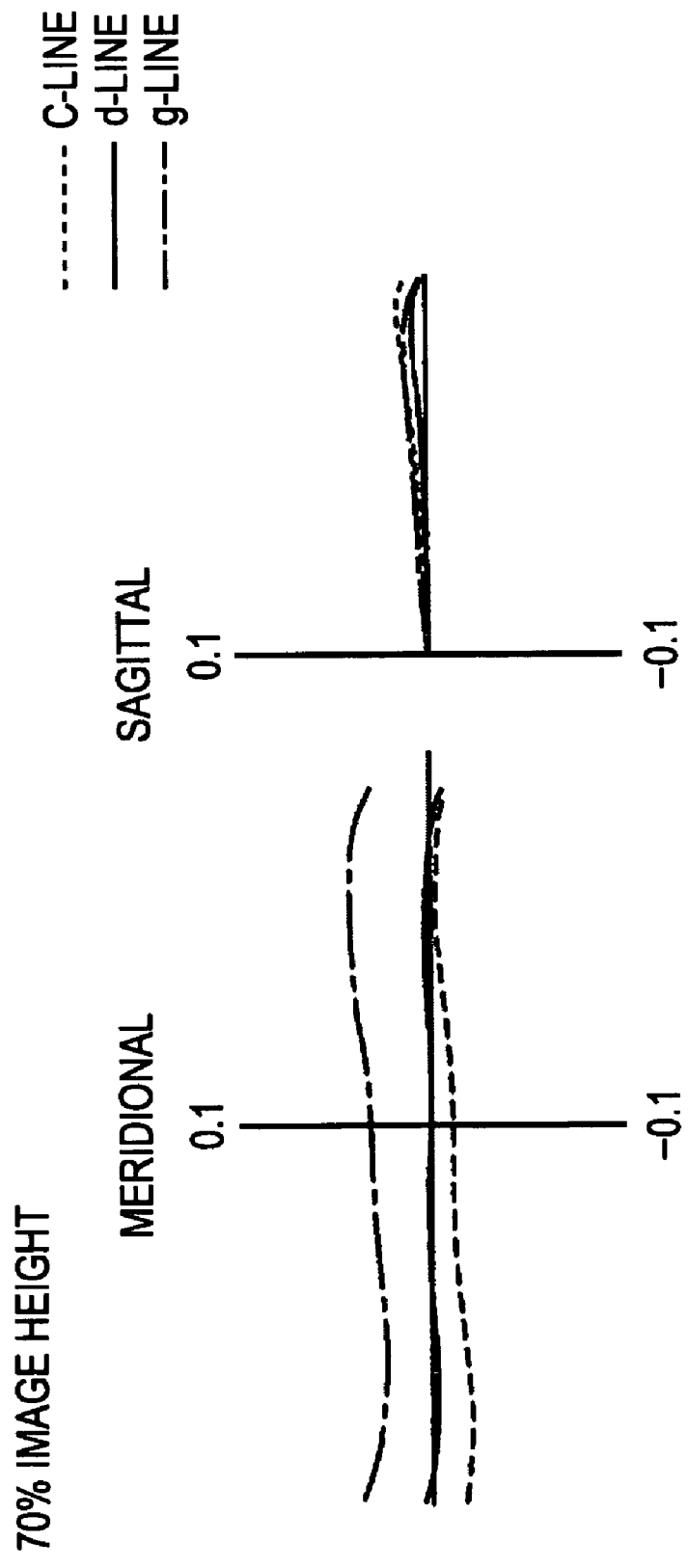
FIG. 23 shows a lateral aberration at the telephoto end.

FIGS. 21 to 23 show lateral aberrations at a 70% image height according to Numerical Example 3. FIG. 21 shows lateral aberrations at the wide-angle end, FIG. 22 shows lateral aberrations at the intermediate focal length, and FIG. 23 shows lateral aberrations at the telephoto end. A solid line represents a value for the d-line, a broken line represents a value for the C-line, and a one-dot chain line represents a value for the g-line. In the lateral aberration diagrams, the vertical axis represents a distance in an image plane, and the horizontal axis represents a height of a ray at the aperture stop.

As shown in each aberration diagram, in particular, as shown in FIGS. 21 to 23, the chromatic aberrations are corrected in a balanced manner at the wide-angle end and the telephoto end according to Numerical Example 3.

Table 16 shows values corresponding to Conditional Expression (6) according to Numerical Examples 1 to 3.

TABLE 16

|                          | Numerical Example 1 | Numerical Example 2 | Numerical Example 3 |
|--------------------------|---------------------|---------------------|---------------------|
| Conditional Expression (6) | −0.29             | −0.16               | −0.13               |

Each lens group of the zoom lens according to any of the above-described embodiments only includes a refractive lens element that deflects an incident ray by refraction, i.e., a lens element of a type in which deflection occurs at an interface between mediums having different refractive indices. However, the type of the lens element is not limited thereto. For example, each lens group may include a diffractive lens element that deflects an incident ray by diffraction, a refractive and diffractive lens element that deflects an incident ray by combination of diffraction and refraction, or a gradient index lens that deflects an incident ray in accordance with refractive index distribution in a medium.

In an embodiment of the present invention, an image can be shifted by shifting a single lens group, a plurality of lens groups from among lens groups constituting a lens system, or a part of a single lens group, in a direction substantially perpendicular to an optical axis. In addition, by associating such lens group with a detecting system that detects a vibration of a camera, a driving system that shifts the lens group, and a controlling system that provides a shift amount to the driving system in accordance with the output of the detecting system, the lens group can serve as a vibration control optical system.

The above-described embodiments, and the shapes and numerical values provided in the numerical examples are merely examples for implementing the present invention.

Therefore, the technical scope of the present invention should not be restrictively interpreted by these examples.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
a zoom lens including at least two movable lens groups;
an image pickup element that converts an optical image formed with the zoom lens into an electric signal; and
an image processor that electrically corrects a lateral chromatic aberration to be generated at the zoom lens,
wherein the zoom lens satisfies Conditional Expressions (1) and (2) as follows, $$-5.0 < W\_ate(X)/T\_ate(X) < -0.2 \quad (1)$$

$$0.003 < |Max\_ate(10)/Himg| < 0.03 \quad (2)$$

where $W\_ate(X)$ is an aberration amount of the lateral chromatic aberration from the C-line to the g-line, at a wide-angle end, corresponding to a (X×10) % image height, $T\_ate(X)$ is an aberration amount of the lateral chromatic aberration from the C-line to the g-line, at a telephoto end, corresponding to a (X×10) % image height, $Max\_ate(X)$ is one of $W\_ate(10)$ and $T\_ate(10)$, the one having a larger absolute value, and Himg is a diagonal length of the image pickup element.

2. The image pickup apparatus according to claim 1, wherein the zoom lens satisfies Conditional Expressions (3), (4), and (5) as follows, $$PSF\_r < \alpha \quad (3)$$

$$PSF\_g < \alpha \quad (4)$$

$$PSF\_b < \alpha \quad (5)$$

where PSF_r is a point spread range of a red component R in an image plane, PSF_g is a point spread range of a green component G in the image plane, PSF_b is a point spread range of a blue component B in the image plane, and α is a desirable resolution, which is a permissible circle of confusion, of the image pickup apparatus.

3. The image pickup apparatus according to claim 1, wherein the image processor has a lateral chromatic aberration information item, a distortion information item, and a marginal illumination information item, in accordance with an image height of the image pickup element and an angle of view of the zoom lens, and the image processor includes a signal processing unit configured to perform predetermined signal processing for an image signal to correct the chromatic aberration on the basis of the information items.

4. The image pickup apparatus according to claim 1, wherein the image processor includes an aberration-amount detecting unit configured to detect an aberration amount of the chromatic aberration by using an image signal obtained from the image pickup apparatus, in accordance with a distance from a reference position in an image on the basis of the image signal, and a signal processing unit configured to perform predetermined signal processing for the image signal to correct the chromatic aberration, on the basis of the aberration amount detected by the aberration-amount detecting unit.

5. A zoom lens for an image pickup apparatus, the image pickup apparatus including an image processor that converts an optical image obtained by capturing into an electric image signal, and electrically corrects a lateral chromatic aberration in an image on the basis of the image signal,
wherein the zoom lens includes at least two movable lens groups, and satisfies Conditional Expressions (1) and (2) as follows, $$-5.0 < W\_ate(X)/T\_ate(X) < -0.2 \quad (1)$$

$$0.003 < |Max\_ate(10)/Himg| < 0.03 \quad (2)$$

where $W\_ate(X)$ is an aberration amount of the lateral chromatic aberration from the C-line to the g-line, at a wide-angle end, corresponding to a (X×10) % image height, $T\_ate(X)$ is an aberration amount of the lateral chromatic aberration from the C-line to the g-line, at a telephoto end, corresponding to a (X×10) % image height, $Max\_ate(X)$ is one of $W\_ate(10)$ and $T\_ate(10)$, the one having a larger absolute value, and Himg is a diagonal length of the image pickup element.

6. The zoom lens according to claim 5, wherein the zoom lens satisfies Conditional Expressions (3), (4), and (5) as follows, $$PSF\_r < \alpha \quad (3)$$

$$PSF\_g < \alpha \quad (4)$$

$$PSF\_b < \alpha \quad (5)$$

where PSF_r is a point spread range of a red component R in an image plane, PSF_g is a point spread range of a green component G in the image plane, PSF_b is a point spread range of a blue component B in the image plane, and α is a desirable resolution, which is a permissible circle of confusion, of the image pickup apparatus.

7. The zoom lens according to claim 5, comprising:
at least first to fourth lens groups in order from an object side, at least the second and fourth lens groups being movable in an optical-axis direction for zooming,
wherein the first lens group has a positive refractive power, the second lens group has a negative refractive power, the third lens group has a positive refractive power, and the fourth lens group has a positive refractive power, the second lens group only including negative lens elements.

8. The zoom lens according to claim 7, wherein the zoom lens satisfies Conditional Expression (6) as follows:

$$-0.5 < f2/ft < -0.05 \quad (6)$$

where f2 is a focal length of the second lens group, and ft is a focal length of a total lens system at a telephoto end.

9. The zoom lens according to claim 7, wherein the second lens group has lens surfaces containing at least an aspherical surface.

10. The zoom lens according to claim 7, wherein the fourth lens group has lens surfaces containing at least an aspherical surface.

11. The zoom lens according to claim 7, wherein the first lens group is fixed during the zooming.

12. The zoom lens according to claim 7, wherein the second and fourth lens groups each include at least a plastic lens.

* * * * *